United States Patent
Gomadam et al.

(10) Patent No.: US 9,953,081 B2
(45) Date of Patent: Apr. 24, 2018

(54) SYSTEM FOR LINKING DIVERSE DATA SYSTEMS

(71) Applicant: Accenture Global Services Limited, Dublin (IE)

(72) Inventors: Karthik Gomadam, San Jose, CA (US); Teresa Sheausan Tung, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/870,671

(22) Filed: Sep. 30, 2015

(65) Prior Publication Data
US 2016/0253364 A1 Sep. 1, 2016

(30) Foreign Application Priority Data
Feb. 26, 2015 (IN) .............................. 919/CHE/2015
Jun. 12, 2015 (IN) ............................ 2954/CHE/2015

(51) Int. Cl.
*G06F 7/00* (2006.01)
*G06F 17/30* (2006.01)

(52) U.S. Cl.
CPC .. *G06F 17/30707* (2013.01); *G06F 17/30312* (2013.01); *G06F 17/30566* (2013.01); *G06F 17/30572* (2013.01); *G06F 17/30684* (2013.01); *G06F 17/30958* (2013.01)

(58) Field of Classification Search
CPC ......... G06F 17/30557; G06F 17/30566; G06F 17/30572
See application file for complete search history.

(56) References Cited

U.S. PATENT DOCUMENTS

| | | | |
|---|---|---|---|
| 2002/0091705 A1* | 7/2002 | Mitomi | G06F 17/30607 707/103 R |
| 2004/0143259 A1 | 7/2004 | Mulier et al. | |
| 2006/0173883 A1 | 8/2006 | Pierce et al. | |
| 2006/0179065 A1 | 8/2006 | Xu | |
| 2007/0130136 A1* | 6/2007 | Cambot | G06F 17/30398 707/4 |

(Continued)

FOREIGN PATENT DOCUMENTS

WO WO 2014-137258 9/2014

OTHER PUBLICATIONS

Bizer, C., et al., Linked data—the story so far, 2009, pp. 122-147, vol. 5, No. 3, International Journal of Semantic and Web Information Systems, United States of America.

(Continued)

*Primary Examiner* — Marc S Somers
(74) *Attorney, Agent, or Firm* — Brinks Gilson & Lione

(57) ABSTRACT

A system creates an abstraction layer surrounding a diverse data system including multiple different databases. Data is received from data sources and ingested into the various databases according to a core model. New instances of the core model are created and added to a larger linked data model (LDM) when new data sources are added to the system. The LDM captures the linkages between different linked data objects and links across different databases. Accordingly, applications are able to access or explore the linked data stored in different databases without prior knowledge of the linking relationships.

15 Claims, 18 Drawing Sheets

(56) References Cited

U.S. PATENT DOCUMENTS

| | | | |
|---|---|---|---|
| 2007/0136384 | A1 | 6/2007 | Hepper et al. |
| 2007/0143259 | A1* | 6/2007 | Uppala ............. G06F 17/30486 707/3 |
| 2007/0198564 | A1 | 8/2007 | Blackstone et al. |
| 2011/0022642 | A1 | 1/2011 | Demilo et al. |
| 2014/0337429 | A1* | 11/2014 | Asenjo ................. H04L 65/403 709/204 |
| 2015/0081701 | A1 | 3/2015 | Lerios et al. |

OTHER PUBLICATIONS

Lambda architecture, http://lambda-architecture.net/, pp. 1-3, accessed Oct. 7, 2015.
Lambda architecture: A state-of-the-art, http://www.datasalt.com/2014/01/lambda-architecture-a-state-of-the-art/, pp. 1-4, accessed Oct. 6, 2015.
Lassila, O., et al., Resource Description Framework (RDF) Model and Syntax Specification, Feb. 22, 1999, pp. 1-45, W3C Consortium, Cambridge, Massachusetts.
Balduini, M., et al., Social listening of City Scale Events using the Streaming Linked Data Framework, Oct. 21-25, 2013, pp. 1-16, The Semantic Web-ISWC 2013, Sydney, Australia.
Prudhommeaux, E., et al., Sparql query language for rdf, 2008, pp. 1-93, W3C Consortium, Cambridge, Massachusetts.
Llaves, A., et al., Towards Efficient Processing of RDF Data Streams, 2003, pp. 45-53, Software Architecture, Springer Publishing Company, New York, New York.
Le-Phuoc, D., et al., A Native and Adaptive Approach for Unified Processing of Linked Streams and Linked Data, 2011, pp. 370-388, The Semantic Web, Springer Publishing Company, New York, New York.
Stonebraker, M., et al., "One Size Fits All": An Idea Whose Time Has Come and Gone, 2005, pp. 2-11, Proceedings of $21^{st}$ International Conference on ICDE, IEEE Computer Society, Piscataway, New Jersey.
Binz, T., et al., Portable Cloud Services Using TOSCA, 2012, pp. 80-85, IEEE Internet Computing, No. 3, IEEE Computer Society, Piscataway, New Jersey.
Martinez-Prieto, M.A., et al., The Solid architecture for real-time management of big semantic data, 2015, pp. 62-79, Elsevier B.V., The Netherlands.
Cuesta, C.E., et al., Towards an Architecture for Managing Big Semantic Data in Real-Time, 2013, pp. 45-53, Springer Publishing Company, New York, NY.
Weng, L., et al., An Approach for Automatic Data Virtualization, 2004, pp. 2433, Proceedings of $13^{th}$ IEEE International Symposium on High performance Distributed Computing, IEEE Computer Society, Piscataway, New Jersey.
Patni, H., et al., Linked Sensor Data, 2010, pp. 362-370, 2010 International Symposium on Collaborative Technologies and Systems (CTS), IEEE Computer Society, Piscataway, New Jersey.
Australian Patent Office, First Examination Report from Australian Patent Application No. 2016201252 dated May 16, 2016, 11 pages.
Australian Patent Office, Second Examination Report from Australian Patent Application No. 2016201252 dated Oct. 28, 2016, 6 pages.
Australian Patent Office, Third Examination Report from Australian Patent Application No. 2016201252 dated Apr. 13, 2017, 5 pages.
Janowicz et al., 'A RESTful Proxy and Data Model for Linked Sensor Data', International Journal of Digital Earth, vol. 6, 2013—Issue 3, pp. 233-254 | Received Feb. 13, 2011, Accepted Aug. 10, 2011, Published online: Sep. 22, 2011.
Ozsu et al., 'Distributed Database Systems: Where Are We Now?', Computer, Year: 1991, vol. 24, Issue: 8, pp. 68-78, DOI: 10.1109/2.84879.
European Patent Office, Extended European Search Report from European Patent Application No. 16157525.3 dated Oct. 27, 2016, 9 pages.

* cited by examiner

SYSTEM FOR LINKING DIVERSE DATA SYSTEMS

PRIORITY CLAIM

This application claims priority to the following applications:

Indian provisional application Ser. No. 919/CHE/2015, filed Feb. 26, 2015, titled System Architecture for Data Lake Contextual Layouts, which is entirely incorporated by reference;

Indian provisional application Ser. No. 2954/CHE/2015, filed Jun. 12, 2015, titled System Architecture for Data Lake Contextual Layouts, which is entirely incorporated by reference; and Indian non-provisional application Ser. No. 919/CHE/2015, filed Aug. 31, 2015, titled System for Linking Diverse Data Systems, which is entirely incorporated by reference.

TECHNICAL FIELD

This disclosure relates to complex system architectures for linking databases within a diverse data system.

BACKGROUND

Traditional approaches for managing enterprise data revolve around a batch driven Extract Transform Load (ETL) process, a one size fits all approach for storage, and an application architecture that is tightly coupled to the underlying data infrastructure. The emergence of Big Data technologies have led to the creation of alternate instantiations of the traditional approach, one where the storage systems have moved from relational databases to NoSQL technologies like Hadoop Distributed File Systems (HDFS). In some cases, traditional approaches to data control in the context of Internet of Things (IoT) and other enterprise data settings have brought forth challenges due to content heterogeneity, requirements of scale, and robustness of ETL processes.

DETAILED DESCRIPTION

Figure 1:
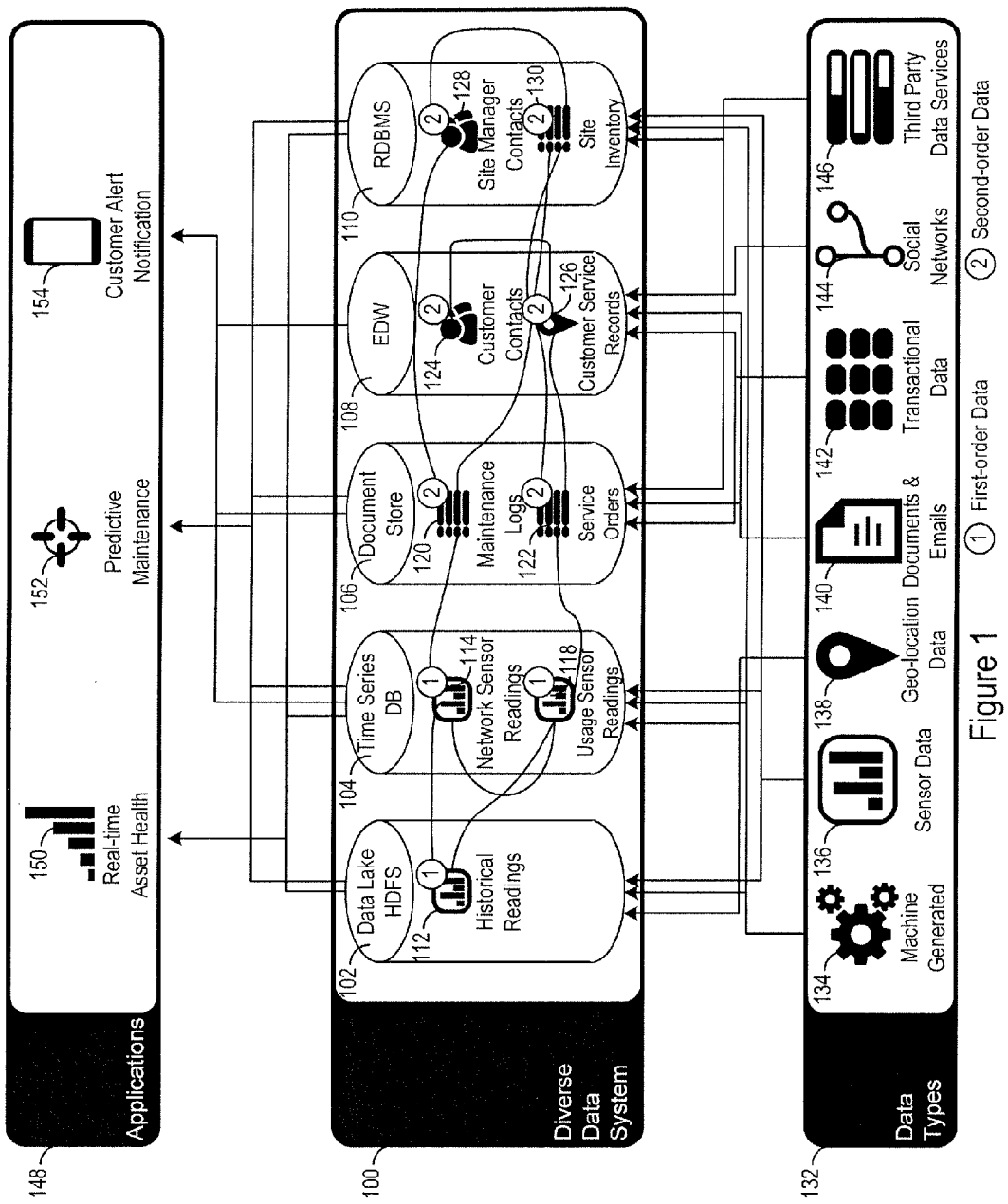
FIG. 1 shows a contextual example of a diverse data system.

FIG. 1 provides an example context for the discussion of various technical solutions for linking data objects within various databases of a diverse data system described in detail below. It is noted that, for the sake of explanation, the systems and logic below are often described within the context of an example water distribution setting. The example water distribution setting may include sensors (e.g., pressure sensors, flow sensors, etc.) and other contextual data associated with the water distribution system. Although the discussion below is indeed applicable to and useful with the example water distribution setting, the technical solutions are not limited to the example water distribution setting.

FIG. 1 illustrates an example diverse data system 100 including multiple disparate databases storing multiple different data objects. For example, and as is illustrated in FIG. 1, these different databases may include a data lake 102 (such as, for example, a Hadoop Distributed File Systems (HDFS)). A data lake 102 is a database or datastore that stores a massive scale and variety of data in its native raw state and/or in an interpreted state. For example, as linked devices (e.g., sensors) generate raw data, that raw data can be stored within the data lake 102 for later consumption, use, or interpretation by applications or users. The data lake 102 may include multiple separate databases and/or datastores that together make up the data lake 102, or the data lake 102 may be a singular datastore.

The diverse data system may also include a time series database 104, a document store 106, an Enterprise Data Warehouse (EDW) 108, and/or a Relational Database Management System (RDBMS) 110. In one example, the data lake 102 may store, amongst other data objects, historical sensor readings or other historical captured or generated data. The time series database 104 may include, for example, network sensor readings 114 and/or usage sensor readings 118. The document store 106 may include, for example, maintenance logs 120 and/or service orders 122. The EDW 108 may include, for example, customer contacts 124 and/or customer service records 126. The RDBMS 110 may include, for example, site manager contacts 128 and/or site inventory data 130. The technical solutions described below apply to any number of different database or datastore types, data objects, and configurations of databases and data objects (e.g., storage locations for varying types of data objects).

FIG. 1 also shows a data type layer 132 including of a number of different example data types from a number of different example data sources. For example, the data types may include machine generated data 134, sensor data 136, geo-location data 138, document and email data 140, transactional data 142, social network data 144, and third party data services data 146, to name a few. Many other data types are possible from many different data sources generating a plethora of data having heterogeneous characteristics. A feature of the proposed system is the ability to use multiple data stores to handle data variety. For example, a pressure sensor may have various types of data including configuration data (e.g., denormalized data), sensor readings (e.g., time series data), and image data (e.g., binary large object (BLOB) data). Typical approaches use a one-size-fits-all approach to store and manage all of the data from the sensor. The disclosed system enables the use of different datastores, each optimized or better suited to handle a particular type of data. For example, columnar stores may perform well for managing time series data, while document stores may perform well for storing denormalized data (e.g., configuration data).

Ultimately, one goal of the present system is to store the data objects from the data sources within one or more databases of the diverse data system 100 in a manner that captures, stores, and manages relational linkages between different data objects in a centralized location and with consistency. By capturing these linkages, the interlinked data objects can be retrieved more efficiently, e.g., consuming less processor time and memory resources.

FIG. 1 also shows an application layer 148 including a number of different example applications that may use various data objects stored within the diverse data system 100. For example, the application layer 148 may include a real-time asset health application 150 (e.g., to determine the heath of a system or network or, for example, to determine an optimal maintenance schedule), a predictive maintenance application 152 (e.g., to determine an impact of downtime on costs or to determine the risk associated with a failure to repair an item), and a customer alert notification application 154 (e.g., to alert customers of leakage events or outages, to predict remediation times, and to provide updates). These are but a few examples of the wide variety of applications that may make use of the data stored within the diverse data system 100.

Data objects stored within the diverse data system 100 may be characterized as first-order data or second-order data. For example, first-order data may include historical readings 112, network sensor readings 114, and/or usage sensor readings 118. These first-order data objects may represent, for example, raw data generated by sensors (e.g., as sensor data 136) or other data sources. Second-order data may represent contextual data, metadata, attribute data, or other data describing or otherwise characterizing the related first-order data or about the related data source (e.g., sensor) generating the first-order data. The second-order data may include maintenance logs 120 and/or service orders 122 (e.g., for a particular sensor or linked device), customer contacts 124 and/or customer service records 126 (e.g., for a customer set impacted by a sensor), and/or site manager contacts 128 and/or site inventory data 130 (e.g., including details for sensor applications, such as, as examples, geographic location and other devices at a similar location).

As is illustrated in FIG. 1, each data source associated with the various data types within the data type layer 132 may generate multiple different portions of data that can be split up and/or redundantly stored in various databases, for example, according to performance needs of that particular data type and the corresponding database. Similarly, each application in the application layer 148 may utilize these and/or other different data objects spread across the multiple different databases. As is illustrated in FIG. 1, and discussed above, the different data objects stored on different databases (or within the same database) may be linked. For example, with a particular sensor, first-order data (e.g., network sensor readings 114) generated by the sensor may be linked to second-order data (e.g., a maintenance log 120 or a stored geographic location associated with the sensor).

One technical challenge addressed is that each application must maintain knowledge of the various links between the various data objects (e.g., between the first-order data and the related second-order data). Further, each application must maintain knowledge of where (e.g., in which database) each data object is stored across the diverse data system and the associated technical information for accessing such data. The technical challenge becomes more apparent as the number of applications in the application layer 148 continues to grow, with more and more applications requiring both first-order and related second-order data. Further still, extensibility of existing systems is limited, hindering the development of future applications that may take advantage of all the data within the diverse data system 100.

Another technical problem exists with respect to data intake as the number of different types of data sources or data types continues to increase. This increasing complexity and size continuously presents developers and IT personnel with difficulties in onboarding new data source types and/or individual data sources into the diverse data system 100 in a consistent and efficient manner that allows for consumption of the data by the application layer 148. For example, in a sensor context, large numbers of sensors may exist and are often tied to purpose-built applications, analytical models, or proprietary platforms that address a fixed set of insights. Onboarding new sensors, new data streams, and new applications or analytics presents a steep entry barrier due to difficulty in integrating access to data and obtaining skilled experts.

Present data control approaches are relatively inflexible or cannot take advantage of heterogeneous data across the diverse data system 100. For example, second-order data may be captured out-of-band and may not be directly linked to the related first-order data. Accordingly, applications often lack the access to valuable second-order data if these linkages are not known.

As one example, a data lake 102 (e.g., a data lake database) is used to store a massive scale and variety of data in its native raw state and/or in an interpreted state. Often, data must be stored within the data lake 102 before it can be leveraged, for example, by the application layer 148. In parallel with data lake storage operations, second-order data (e.g., context data) may exist or be generated as discussed above. Often, the data stored in the data lake 102 is not linked to its associated context data stored elsewhere. Indeed, some applications within the application layer 148 may be aware of the linking (e.g., because they are initially programmed with the knowledge by developers) and may utilize the second-order data, but the information regarding such linking is generally not available to all other applications. Accordingly, other applications within the application layer 148 unaware of the linking face the difficult technical challenge of finding and effectively using of the second-order context data.

Figure 2:
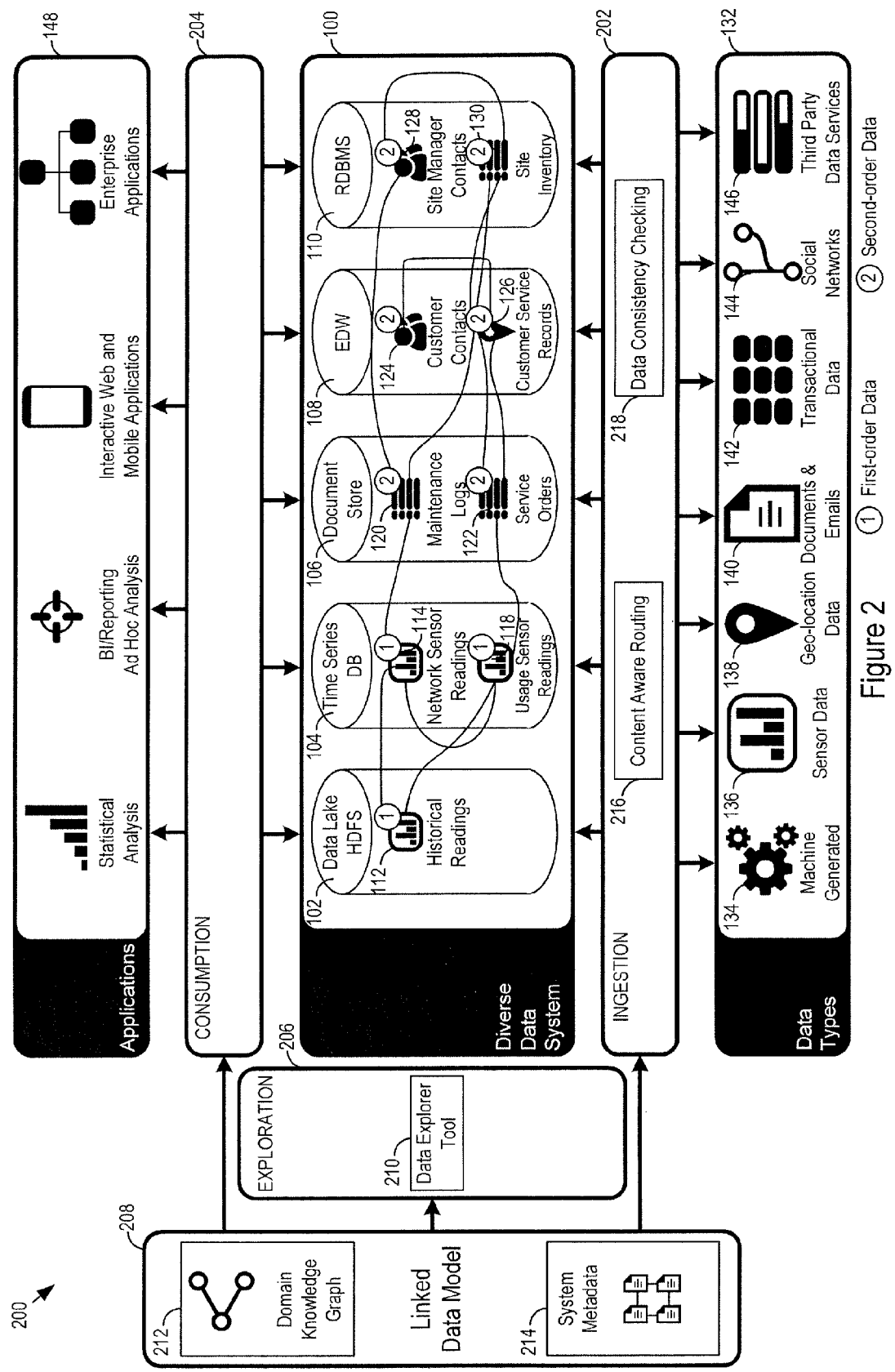
FIG. 2 shows an example data control system in accordance with various embodiments.

FIG. 2 shows a new data control system 200. As with FIG. 1, FIG. 2 shows the diverse data system 100, the data type layer 132, and the application layer 148. However, the data control system 200 also includes data ingestion circuitry 202, data consumption circuitry 204, data exploration circuitry 206, and linked data model (LDM) control circuitry 208.

The data ingestion circuitry 202 is in communication with or otherwise coupled to the data type layer 132. More specifically, the data ingestion circuitry 202 is in communication with multiple data sources (e.g., sensors) having various diverse data types, and is configured to receive datasets from the data sources. The data ingestion circuitry 202 is also in communication with or otherwise coupled to the diverse data system 100. More specifically, the data ingestion circuitry 202 is in communication with the multiple databases within the diverse data system 100 and is configured to transmit datasets or portions of datasets (e.g., from data sources) to the databases for storage. The data ingestion circuitry 202 is also in communication with or otherwise coupled to the LDM control circuitry 208 and possibly other circuitry or modules. The data ingestion circuitry 202 may include content aware routing circuitry 216 and data consistency checking circuitry 218, the functions of each are discussed below.

The data consumption circuitry 204 is in communication with or otherwise coupled to the application layer 148 or, more specifically, various applications within the application layer 148. The data consumption circuitry 204 is also in communication with or otherwise coupled to the diverse data system 100 or, more specifically, various databases within the diverse data system 100. The data consumption circuitry 204 is also in communication with the LDM control circuitry 208.

Figure 3:
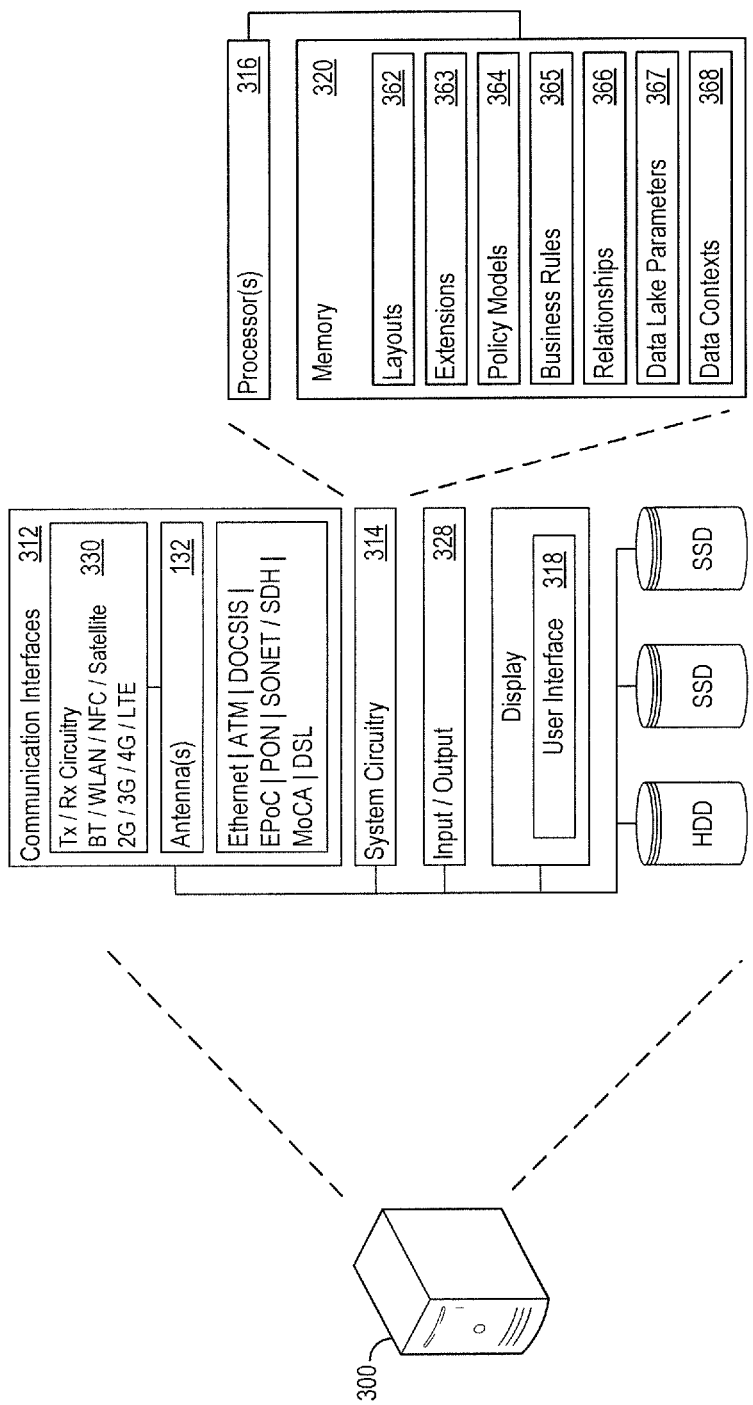
FIG. 3 shows an example specific system implementation.

The data ingestion circuitry 202 and the data consumption circuitry may also both be in communication with or each include a communication interface (e.g., instances of communication interface 312 shown in FIG. 3). For example, communication between the data ingestion circuitry 202 and the data sources and/or the databases of the diverse data system 100 may be effected through such a communication interface such that the communication interface is configured to effect receipt or transmission of datasets or other information on behalf of the data ingestion circuitry 202. Similarly, communication between the data consumption circuitry 204 and the applications and/or the databases of the diverse data system 100 may be effected through such a communication interface such that the communication interface is configured to effect receipt or transmission of datasets or other information on behalf of the data consumption circuitry 204.

The data exploration circuitry 206 is in communication with or otherwise coupled to the LDM control circuitry 208 and, in some embodiments, the diverse data system 100.

The LDM control circuitry 208 may store and/or maintain a domain knowledge graph 212. The domain knowledge graph 212 is an extensible graph-based model that captures domain entities (e.g., sensors or systems) and relationships between them. The LDM control circuitry 208 may also store and/or maintain system metadata 214. The system metadata 214 may include metadata that facilitates overall operation of the data control system 200. For instance, the system metadata 214 may include system topography information such as, for example, the type of data or authentication procedures that each database may require, IP addresses of each database, type information (e.g., type of database) for each database, and service provider for each database.

Figure 16:
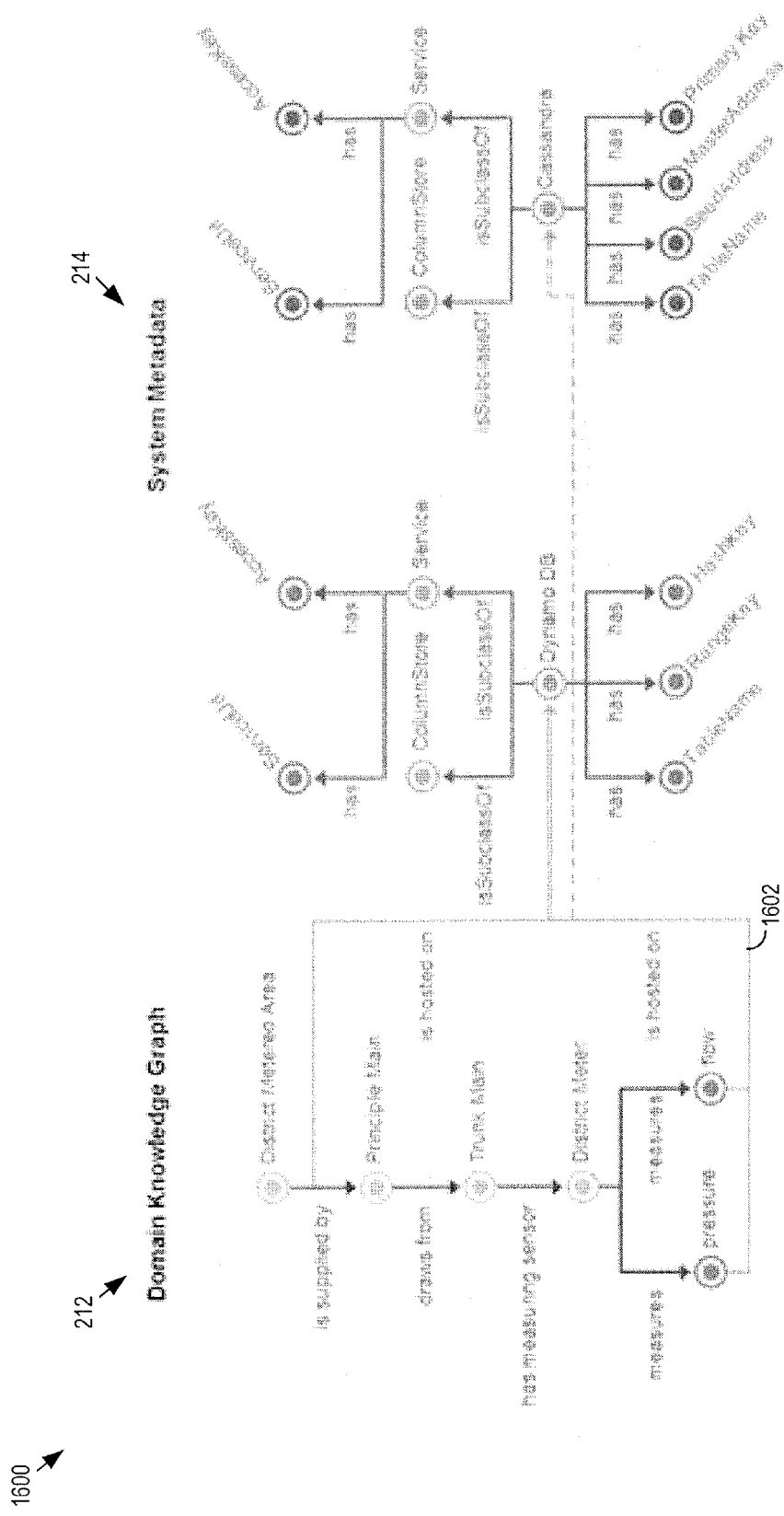
FIG. 16 shows an example interconnection between a domain knowledge graph and system metadata.

FIG. 16 shows an example of an interconnection 1600 between the domain knowledge graph 212 and system metadata 214. The domain knowledge graph 212 includes various domain entities (here, shown as District Metered Area, Principle Main, Trunk Main, District Meter, pressure, and flow). The system metadata 214 includes information multiple entities (two shown in FIG. 16) with data about different databases. Other types of system metadata entities and other metadata may also be captured as part of the system metadata 214. The individual entities for the system metadata 214 may also exist in the same graph form discussed elsewhere (for example, as used by the domain knowledge graph 212). A system model 1602 captures relationships between the domain knowledge graph 212 and the entities of the system metadata 214. Although only a few connections are shown in the system model 1602 of FIG. 16, the system model 1602 may include many relationships. For example, an entity may exist for every instance of a database within the domain knowledge graph 212 relating to the metadata for that particular database.

The data ingestion circuitry 202 and the data consumption circuitry 204 coordinate with the LDM control circuitry 208 to provide a layer of abstraction between data sources and the databases of the diverse data system 100 and a layer of abstraction between applications in the application layer 148 and the databases of the diverse data system 100. Further, the data exploration circuitry 206 helps to meet the technical challenge of exploration of linked data objects within the disparate databases of the diverse data system 100 and includes additional features such as semantic search or query responses. For example, the circuitry elements may operate individually or together to provide contextualized queries and searches, cross-repository queries and associated cross-repository query plans, response integration, cross-system indexing, data assembly and inference, rule-driven ETL, source-based enrichment, and datatype-driven workflow. Thus, as will be described in further detail below, consumption and/or exploration of data and its associated linked data (e.g., second-order data or context data) may be agnostic to knowledge of the particular database(s) assigned to a particular data type, or the technical specifics as to how to access such data. In certain approaches, to effect this type of abstraction, the data consumption circuitry 204 and/or the data exploration circuitry 206 may provide an interface (e.g., an application program interface (API)) to the applications or other devices.

FIG. 3 shows an example specific system implementation 300 for the system described above. The system implementation 300 may include system circuitry 314 to support implementation of the data control techniques, including data ingestion, data consumption, data exploration, and LDM control, as well as presentation of visualizations of core models and instances of core models. The system circuitry 314 may include processors 316, memory 320, and/or other circuitry. Further, in some embodiments, various circuitry elements may be implemented by the system circuitry 314. For example, the data ingestion circuitry 202, the data consumption circuitry 204, the data exploration circuitry 206, and/or the LDM control circuitry 208 may be implemented by one or more instances of the system circuitry 314. The memory 320 may store the data and/or media for available layouts 362, extensions 363, policy models 364, business rules 365, relationships 366, database parameters 367, and data contexts 368.

The system implementation 300 may also include commutation interfaces 312, which may support wireless, e.g., Bluetooth, Wi-Fi, WLAN, cellular (4G, LTE/A), and/or wired, Ethernet, Gigabit Ethernet, optical networking protocols, and/or other networks and network protocols. The communication interface 312 may be connected or configured to connect to one or more networks, including the Internet or an intranet. The communication interface may support communication with external or third-party servers or databases and/or data sources (e.g., in a networked or IoT implementation). The system implementation 300 may include various I/O interfaces 328. The system implementation 300 may also include a display and user interface 318 that may include human interface devices and/or graphical user interfaces (GUI). The GUI may be used to present a control dashboard, actionable insights and/or other information to a user. In various implementations, the GUI may support portable access, such as, via a web-based GUI.

As is described in detail below, the data control system 200 may utilize core models or instances of core models. A core model represents a schema of structured relationships between data objects, elements, and/or other aspects associated with a device, system, or another thing. The data ingestion circuitry 202 and the LDM management circuitry 208 can repeatedly use the core models to instantiate the thing to which the core model relates. For example, a sensor core model can be repeatedly used to instantiate each sensor that is implemented within a system. Further, the core model may exist as part of the domain knowledge graph 212 of the linked data model (LDM) 700 and may be interlinked within the domain knowledge graph to particular instances of the core model (discussed below).

Figure 4:
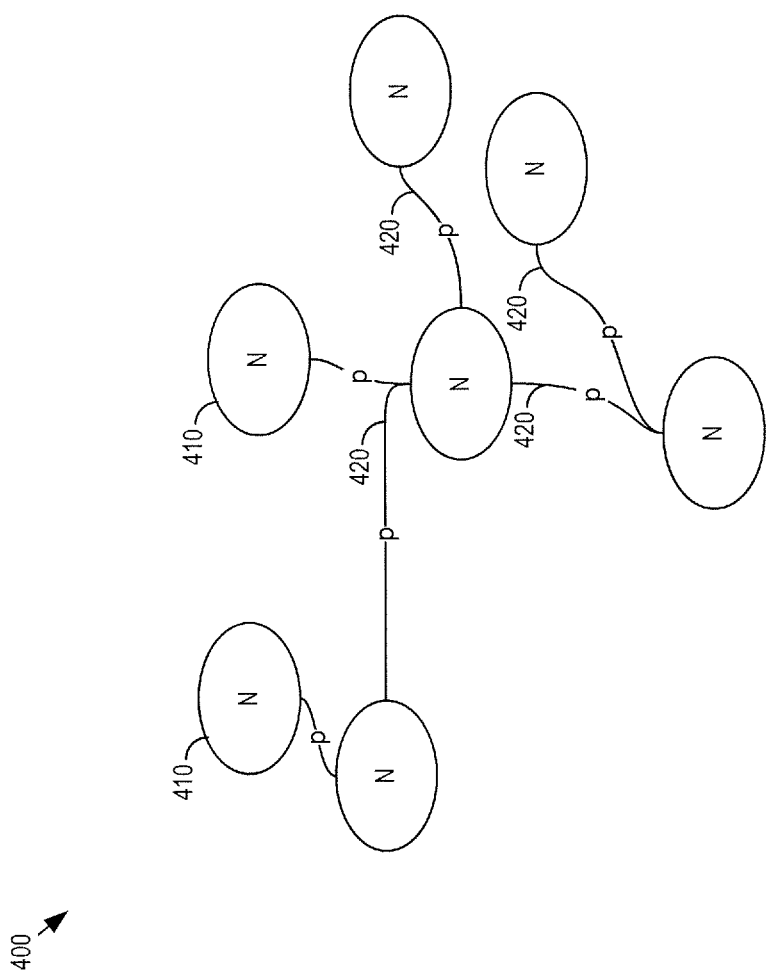
FIG. 4 shows an example core model for use with the data control system.

FIG. 4 shows an example core model 400. The example core model 400 includes nodes 410 and relationship edges 420. Relationship edges 420 may also be assigned properties p that describe a predicate relationship. Additionally or alternatively, the data control system 200 may attach rules to the individual nodes N 410. The attached rules may govern the allowable edges based on operations on the edge properties of the individual nodes N 410. For example, if a Webapp is deployed on Internet information sources (IIS) (e.g. a web server), a rule may assert that the operating system must be a Windows-based operating system. Rules may be modeled in a rule language, and may be evaluated using a rule engine. Examples of rule languages include SPARQL rules, SPIN, RuleML, and Drools. Rules may be used for verification or deployment of mapping relationships. An example core model applying the principles discussed above in a contextual example is illustrated in FIG. 5.

Figure 5:
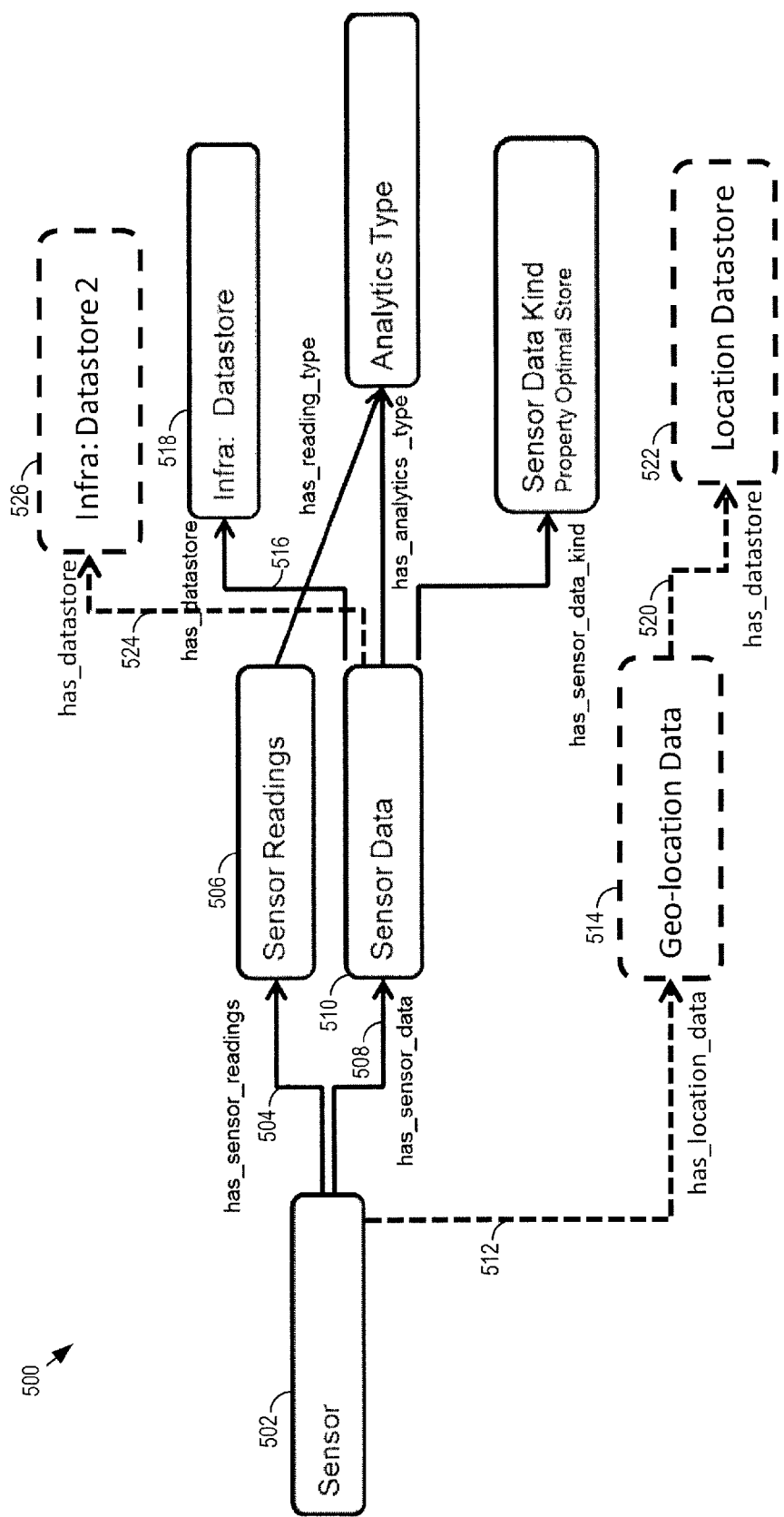
FIG. 5 shows another example core model for use with the data control system in accordance with a contextual example.

FIG. 5 illustrates an example core model 500 for a sensor. The core model 500 includes nodes and edges that establish relationships between the nodes. Node 502 may indicate the overall core model type (e.g., a sensor core model). Relationship edge 504 may indicate that this sensor core model has sensor readings of type "sensor readings," as is indicated at node 506. Relationship edge 508 may indicate that this sensor core model has sensor data of type "sensor data," as is indicated at a first dataset type node 510 that corresponds to a type of dataset. Similarly, relationship edge 512 may indicate that this sensor core model has location data of type "geo-location data," as is indicated at a second dataset type node 510 that corresponds to a second type of dataset. Relationship edge 516 may indicate that the first dataset type node 510 has datastore of type "datastore," as is indicated at a first database node 518 that corresponds to a first database. Thus, relationship edge 516 may establish a relationship property for storage of the first dataset type (corresponding to the first dataset type node 510) in the first database.

Relationship edge 520 may indicate that the second dataset type node 514 has datastore of type "location datastore," as is indicated at a second database node 522 that corresponds to a second database or datastore. Thus, relationship edge 520 may establish a relationship property for storage of the second dataset type (second dataset type node 514) in the second database. In one embodiment, the relationship edge 524 may indicate that the first dataset type node 510 also has datastore of type "datastore 2," as is indicated at a third database node 526 that corresponds to a third database or datastore. Thus, relationship edge 524 may establish a relationship property for storage of the first dataset type (first dataset type node 510) in the third database. The first, second, and third databases may be individual databases of the diverse data system 100 illustrated in FIGS. 1 and 2.

Other nodes and edges may exist within the example core model 500 (e.g., the depicted nodes labelled "analytics type" and "sensor data kind" and associated edges labelled "has_reading_type", "has analytics_type", and "has_sensor_data_kind"). Reference to this example sensor core model 500 is made throughout this disclosure as part of a contextual example provided to aid the reader in understanding of the data control system 200 and associated logic. However, techniques employed by the data control system 200 apply to nearly any type of core model. Indeed, many application settings may utilize many varying core models to link generated data and their associated databases.

In various embodiments, the core model 400 or 500, as well as the domain knowledge graph 212, may be a graphic core model representation. In certain embodiments, graphic core models or graphs may be created or represented using Resource Description Framework (RDF) or another graphic modeling framework. The graphic core model or graphic domain knowledge graph 212 representation may be displayed on a display device for reviewing or editing, for example, via user interface 318.

Figure 6:
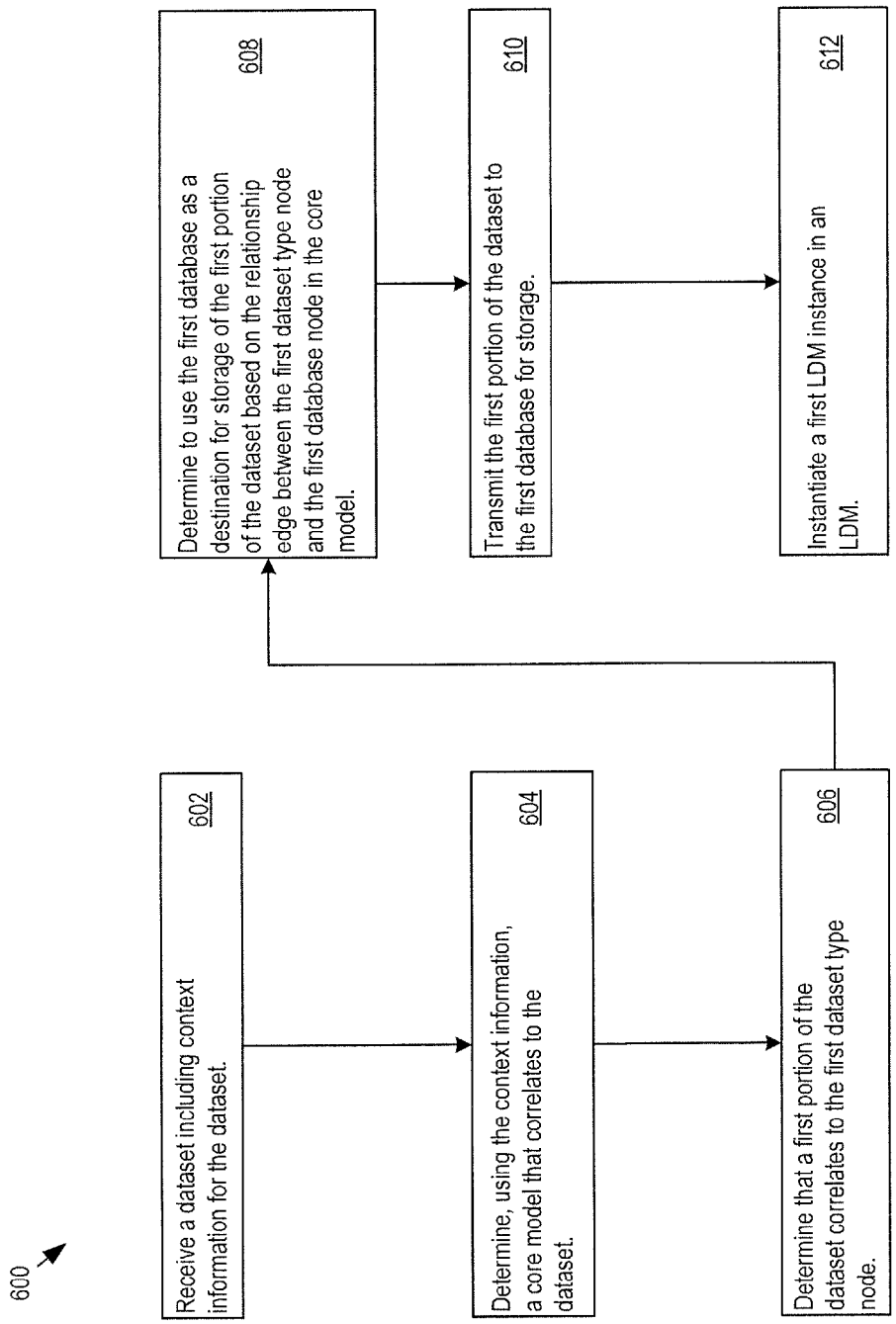
FIG. 6 shows a flow diagram of logic that the data control system may implement.

FIG. 6 shows an example of logic 600 that the data control system 200 may implement. For instance, the data ingestion circuitry 202 may be configured to perform all or some of the logic shown in FIGS. 6 and 10. Similarly, the LDM control circuitry 208 may perform all or some of the logic shown in FIGS. 6 and 10. The logic 600 involves data ingestion via the data ingestion circuitry 202. In some embodiments, the logic 600 may be part of an automated onboarding procedure to incorporate new data sources to the system.

A communication interface receives a dataset (602). The communication interface may be, for example, communication interface 312 or a separate communication interface of the data ingestion circuitry 202. The dataset may be generated from a data source (e.g., a sensor) as discussed above and/or transferred over a network (e.g., the Internet or a different dedicated network type). The dataset may be received as a bitstream, packet data, and/or in another form. The dataset may include dataset context information such as, for example, metadata or other data about or associated with the dataset and/or about the data source. For example, the context information may include various examples of second-order data discussed above with respect to FIG. 1 (e.g., a name of a data source, a time-stamp for the generated data, a geographical location of the data source, an IP address for the datasource, etc.). In various embodiments, the dataset includes a first portion. In other embodiments, the dataset also includes a second portion, while in other examples still the dataset includes more than two portions. These example first or second portions may include first-order data generated or captured by the data source. Alternatively, one or both of these portions may include second-order context data discussed above, or data from other data sources. Many variations are possible and are contemplated by this disclosure.

A processor determines a core model that correlates to the dataset (604). The processor may be processor 316 or another processing device. The processor may be part of the data ingestion circuitry 202 or may instantiate the data ingestion circuitry 202. The core model (discussed in greater detail below) is determined based on, in one example, the dataset context information included with the received dataset. The processor 316 may detect the dataset context information and select a particular core model that suits the dataset context information (or other information within the dataset) from a pool of core models. For example, the dataset context information may identify the dataset as coming from a particular type of data source (e.g., a pressure sensor) or may be of a particular data type (e.g., pressure sensor data). In this example, the processor 316 may select the example sensor core model 500 as the correlating core model.

The processor 316 determines that a first portion of the dataset correlates to the first dataset type node 510 (606). In one implementation, the processor 316 makes this determination by determining what the first portion of the dataset is (e.g., sensor data in this example) and matching that to the corresponding node, being the first dataset type node 510 (e.g., labelled "sensor data" in this example) of the core model 500. The matching may be performed by traversing the core model 500 along the relationship edges. For example, if the dataset has a first portion that is sensor data (perhaps indicated as such by various headers and/or through programmed knowledge of the data structure of the received dataset), then the relationship "has_sensor_data" leads to the proper location of dataset type node 510.

The processor 316 determines the first database as a destination for storage of the first portion of the dataset (608). In various embodiments, this determination is made based on the relationship edge 516 between the first dataset type node 510 and the first database node 518. In other examples, this determination may be made based on multiple relationship edges that may pass through one or more other nodes, and is not limited exclusively to a direct relationship edge linking such as with example relationship edge 516 above.

The communication interface 312 (e.g., as part of the data ingestion circuitry 202) transmits the first portion of the dataset to the first database for storage (610). Continuing with the contextual example, if first dataset type node 510 corresponds to raw sensor data, and if first database node 518 corresponds to the data lake 102 as the first database, then the communication interface 312 transmits the raw sensor data to the data lake 102 for storage.

The logic 600 determines in which database to store a dataset or portion of a dataset. This may be helpful, for example, as part of an onboarding procedure where a data source is connected into the system. By performing the onboarding according to the rules dictated in a core model, and by repeating that onboarding procedure using the same core model for multiple data sources, uniform handling of particular data sources and data types can be achieved. By leveraging existing core models, the technical challenges presented by the onboarding process are met, thereby improving efficiency and allowing non-expert staff to perform the onboarding procedures.

In some examples, the content aware routing circuitry 216 of the data ingestion circuitry 202 implements the logic discussed above (602, 604, 606, 608, and/or 610) and identifies the type of data being processed (e.g., sensor data) and the correct database into which to store the received data. For example, the content aware routing circuitry 216 may perform the onboarding procedure for new data sources. In another example, if a data source has already been onboarded, the content aware routing circuitry 216 may query or traverse the domain knowledge graph 212 to identify the proper database for storage of data received from a particular data source based on the relationships created during a previously-executed onboarding process for that data source.

Upon determining the correct database into which to store the received data, the data consistency checking circuitry 218 may review the domain knowledge graph 212 and/or the pertinent core model 500 to determine the attributes that are required for storing the data and ensure those attributes are present before storing the data. For example, to store pressure data from a sensor, configuration data from the sensor may need to be present (e.g., which may be stored in a document store database). The data consistency checking circuitry 218 ensures this requirement is met before storing the pressure data. If these requirements are not met, the pressure data may be dropped or stored in a temporary location. By performing this procedure, the data consistency checking circuitry 218 maintains consistency for all data within the diverse data system 100 according to the core models.

In some system implementations, in order to maintain a record of the multiple data sources, their associated data types, portions of datasets, database destinations, other information, and the linking relationships, the data control system 200 defines a linked data model (LDM).

Figure 7:
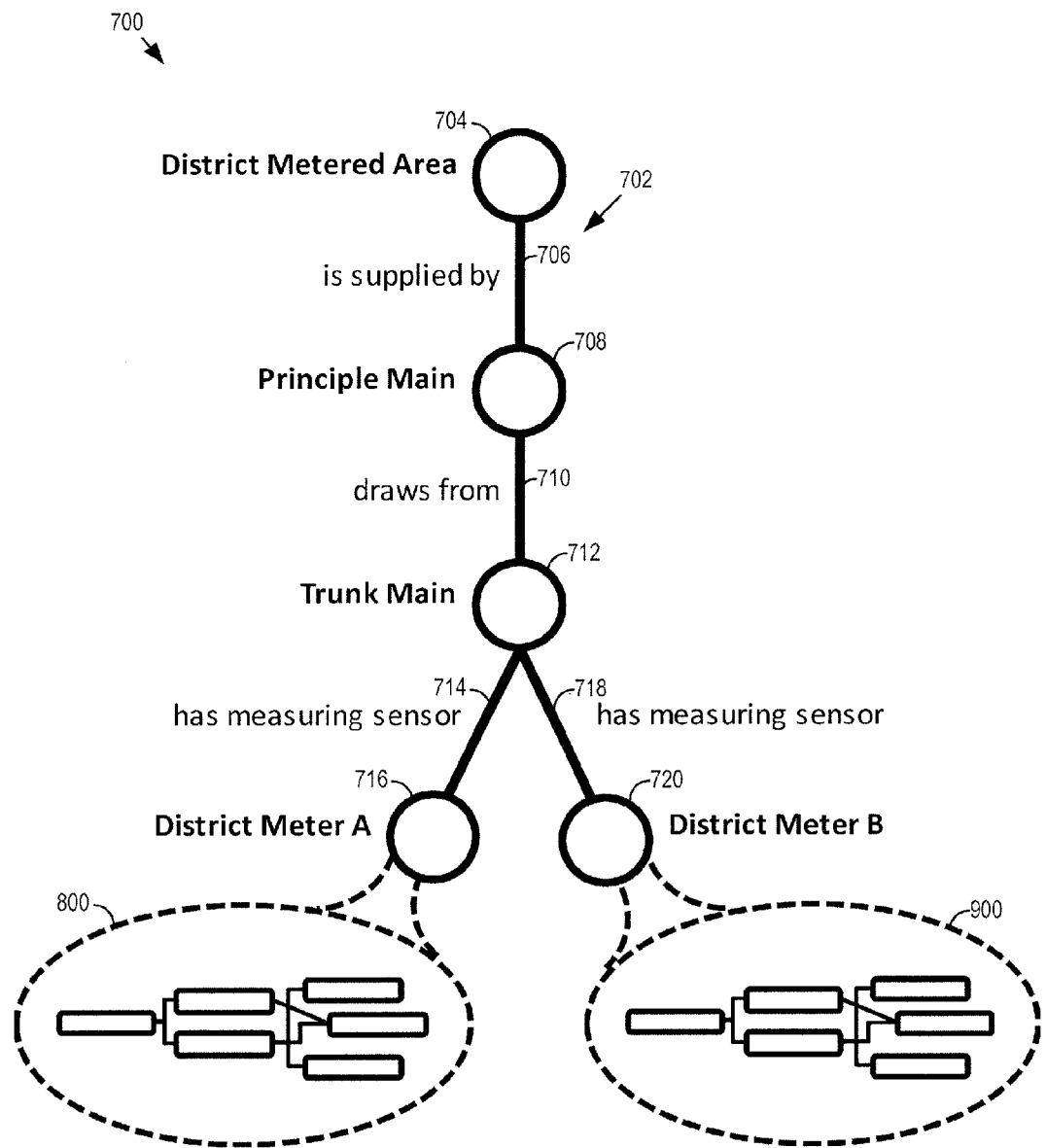
FIG. 7 shows an example linked data model (LDM).

FIG. 7 shows an example LDM 700. The LDM 700 is described within the example contextual water distribution environment. However, the use and structure of the LDM 700 is not limited to the use and structure described with respect to the example contextual environment. The LDM 700 is an extensible graph-based data model including many interlinked instances of core models (e.g., that each mimics the elements and structure of the core model from which they were instantiated). For example, in one approach, the LDM can be viewed as a system level data model that appends individual instances of core models at specified locations. In another approach, and as is illustrated in FIG. 7, the LDM 700 can be broken into different logical layers. For example, the LDM 700 may include a domain knowledge graph 702 (similar to or the same as domain knowledge graph 212 in FIG. 2) including multiple nodes. The nodes may each represent or include an instance of a core model. For example, node 716, labelled "District Meter A" in this example, is a first LDM instance 800 (see FIG. 8) of a core model (e.g., of core model 500). Similarly, node 720, labelled "District Meter B" in this example, is a second LDM instance 900 (see FIG. 9) of a core model (e.g., also of core model 500). Other nodes, such as node 704 labelled "District Metered Area," node 708 labelled "Principle Main," and node 712, labelled "Trunk Main" in this example may include different instances of different core models. For example, node 712, may include an instance of a core model for sensors or other data associated with a trunk main instead of the example core model 500.

The various nodes of the domain knowledge graph 702 can be created by the LDM control circuitry 208 in relation to at least one other node. As such, in various approaches, the domain knowledge graph 702 may include relationship edges in the same manner as the core models 400 and 500 discussed above. Continuing with the contextual example, relationship edge 706 between node 704 and node 708 indicates the principle main (node 708) is supplied by the district metered area (node 704); relationship edge 710 indicates the trunk main (node 712) draws from the principle main (node 708); the relationship edges 714 and 718 indicate that the trunk main (node 712) has measuring sensors district meter A (node 716) and district meter B (node 720). In this manner, the domain knowledge graph 702 can be viewed as a set of nested instances of core models within another larger graph model (e.g., a system-wide or region-wide graph model). Additional levels of upward or downward nesting are possible. For example, different domain knowledge graphs can exist for different top-level nodes (e.g., node 704 "District Meter Area"). Additionally, like the core models 400 or 500, the domain knowledge graph 702, and the LDM 700 as a whole, may be a graphic model representation, for example, modeled using RDF or any other graphic modeling frameworks as is understood in the art, and capable of being displayed on a display device for reviewing or editing by a user.

The LDM control circuitry 208 manages (e.g., creates, updates, stores, and reviews) the LDM 700. The LDM 700, including the domain knowledge graph 702 and any instances of core models, may be stored in a memory, such as memory 320, or other storage device. The memory may be part of the LDM control circuitry. The LDM may be stored across multiple memories that may be interconnected locally or via a network (e.g., stored in various servers or in the cloud).

Returning to FIG. 6, the LDM control circuitry 208 instantiates a first LDM instance 800 in the LDM 700 (612).

Figure 8:
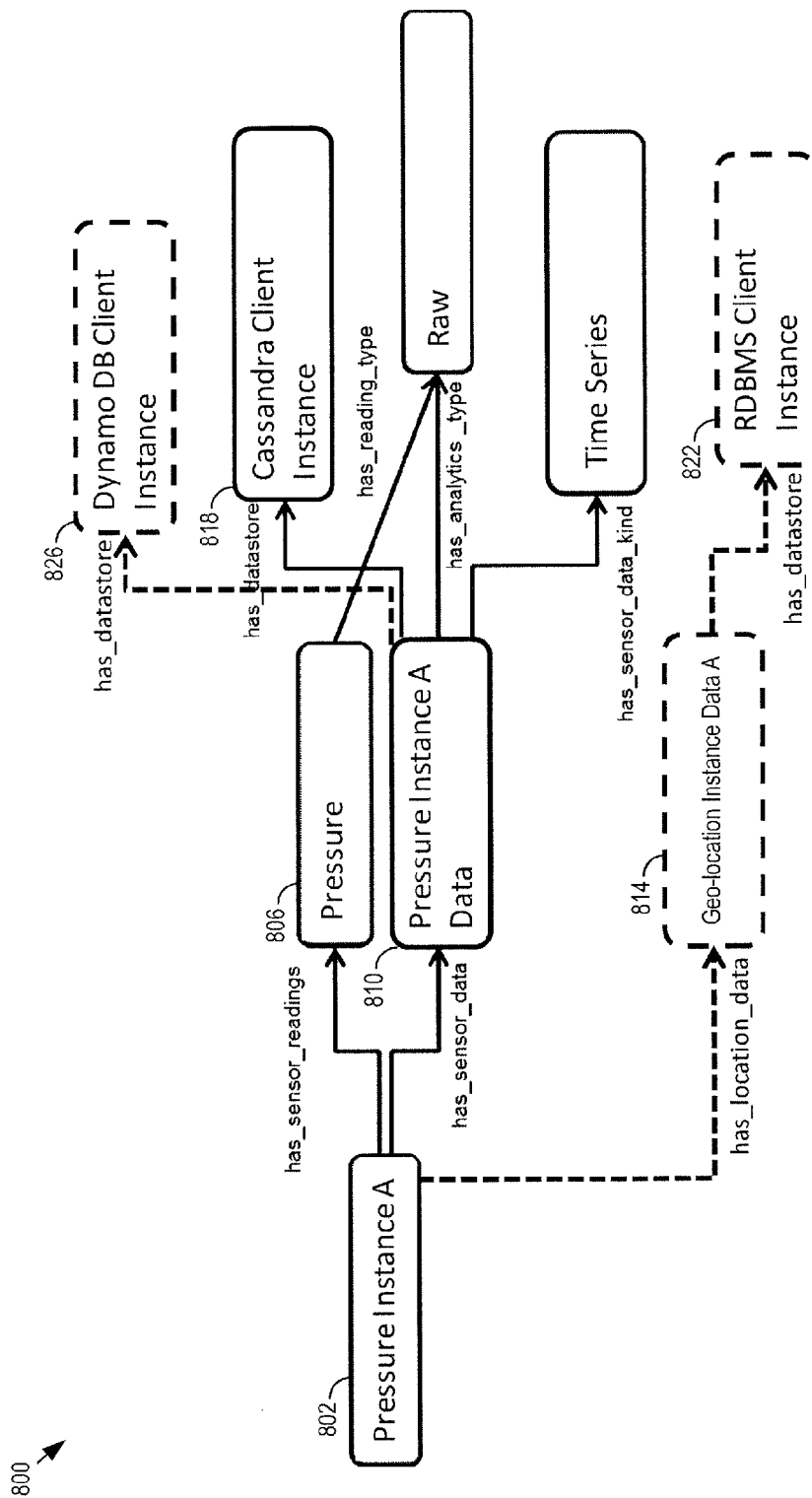
FIG. 8 shows an example of a first LDM instance of a core model in accordance with a contextual example.

FIG. 8 shows an example of a first LDM instance 800 of core model 500. The LDM instance in FIG. 8 is described within the contextual water distribution example. However, the use and structure of the LDM instance is not limited to the example contextual environment and structure provided. The example first LDM instance 800 may be instantiated during an onboarding procedure. In this example, the first LDM instance 800 was created during onboarding of a pressure sensor "Pressure Sensor A." The first LDM instance 800 will have a definitional structure (e.g., nodes and relationship edge arrangements) that mimics (e.g., is identical to) or is nearly the same as the structure of the corresponding core model because the first LDM instance 800 is instantiated according to the schema of that core model (e.g., core model 500). Reference is made to both the core model 500 of FIG. 5 and the first LDM instance 800 of FIG. 8 to describe the inter-relationship.

In one embodiment, the first LDM instance 800 includes an identification node 802 (here, "Pressure Instance A") of the first LDM instance 800 as an instance of core model node 502; sensor readings 806 (here, "Pressure") as an instance of core model node 506 sensor readings; a representation of (e.g., a name of, an address of, a pointer to, etc.) the first portion of a dataset 810 (here, being "Pressure Instance A Data") as an instance of the first dataset type node 510; a representation of the second portion of a dataset 814 (here, being "Geo-location instance Data A") as an instance of the second dataset type node 514; a representation of the first database 818 (here, being "Cassandra Client Instance") as an instance of the first database node 518; a representation of the second database 822 (here, being "RDBMS Client Instance") as an instance of the second database node 522; and a representation of the third database 826 (here, being "Dynamo DB Client Instance") as an instance of the third database node 526. Similar or identical relationship edges may exist in the first LDM instance 800 as the example core model 500. Once instantiated by the LDM control circuitry 208, the first LDM instance 800 is saved as part of the LDM 700 to be recalled or navigated at a later time.

Figure 18:
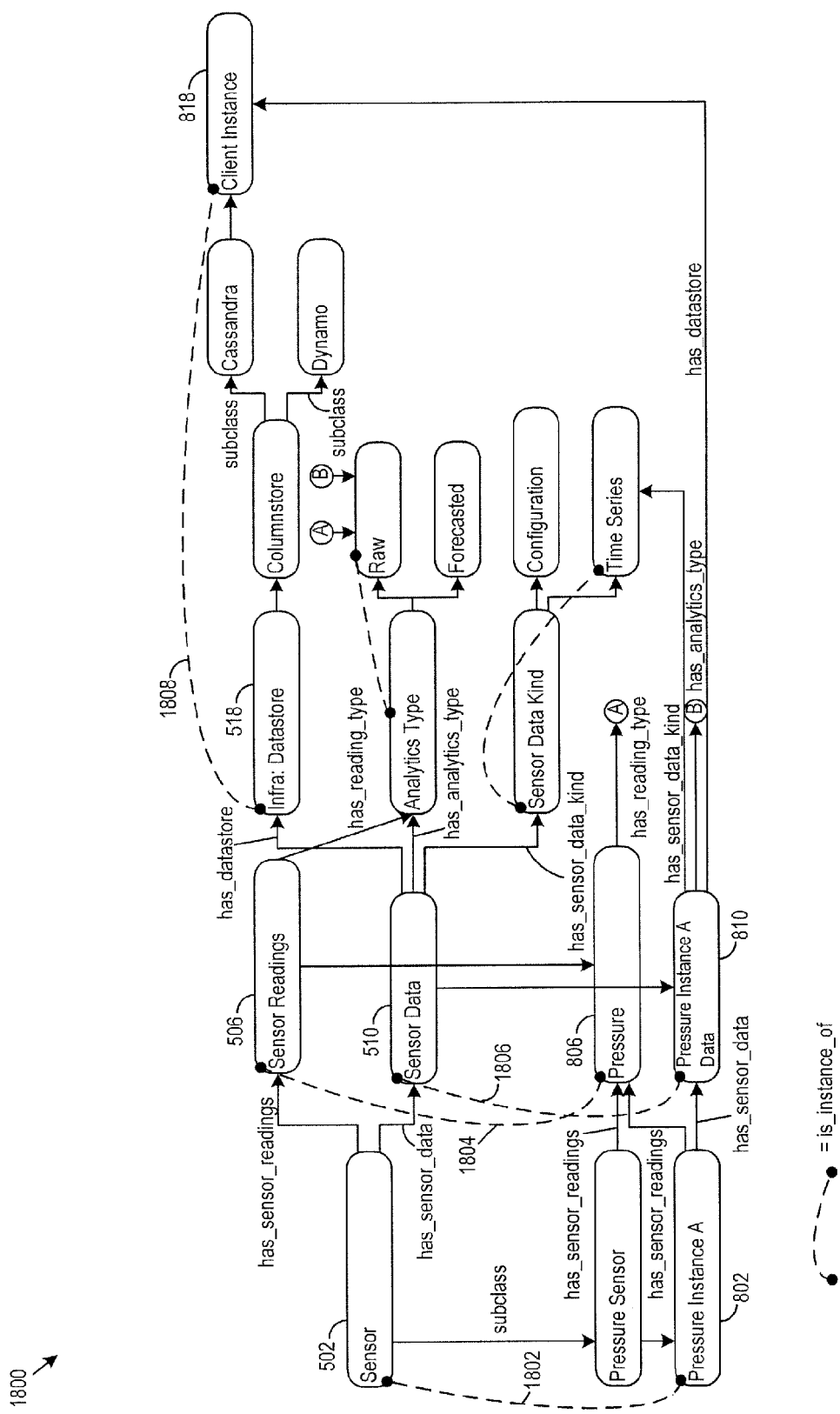
FIG. 18 shows an example connection between a core model and an instance of a core model.

FIG. 18 shows a diagram 1800 illustrating an example of the connection between an instance of a core model within the domain knowledge graph 702 and the related core model. In this example, the first LDM instance 800 is shown next to the core model 500. As discussed above, the first LDM instance 800 is created according to the schema of the core model 500, and is populated accordingly. Connections (shown in dashed lines and representing "is an instance of") may be made within the LDM 700 between the various nodes of the first LDM instance 800 and the core model 500 to capture their relationships. For example, identification node 802 ("Pressure Instance A") is shows as an instance of 1802 node 502; sensor readings 806 (here, "Pressure") is shown as an instance of 1804 core model node 506 "sensor readings"; a representation of the first portion of a dataset 810 ("Pressure Instance A Data") is shown as an instance of 1806 the first dataset type node 510; and a representation of the first database 818 (here, being "Cassandra Client Instance") is shown as an instance of 1808 the first database node 518. Other connections between the first LDM instance 800 and the core model 500 are shown in a similar manner.

In various approaches, the instance of a particular database (e.g., the representation of the first database 818) for a particular type of data object (e.g., the first portion of a dataset 810) may not be populated or completed until after the data has been successfully stored in the indicated database. This ensures that the LDM 700 captures only where data actually is located (rather than only where it was intended to be stored at).

Figure 9:
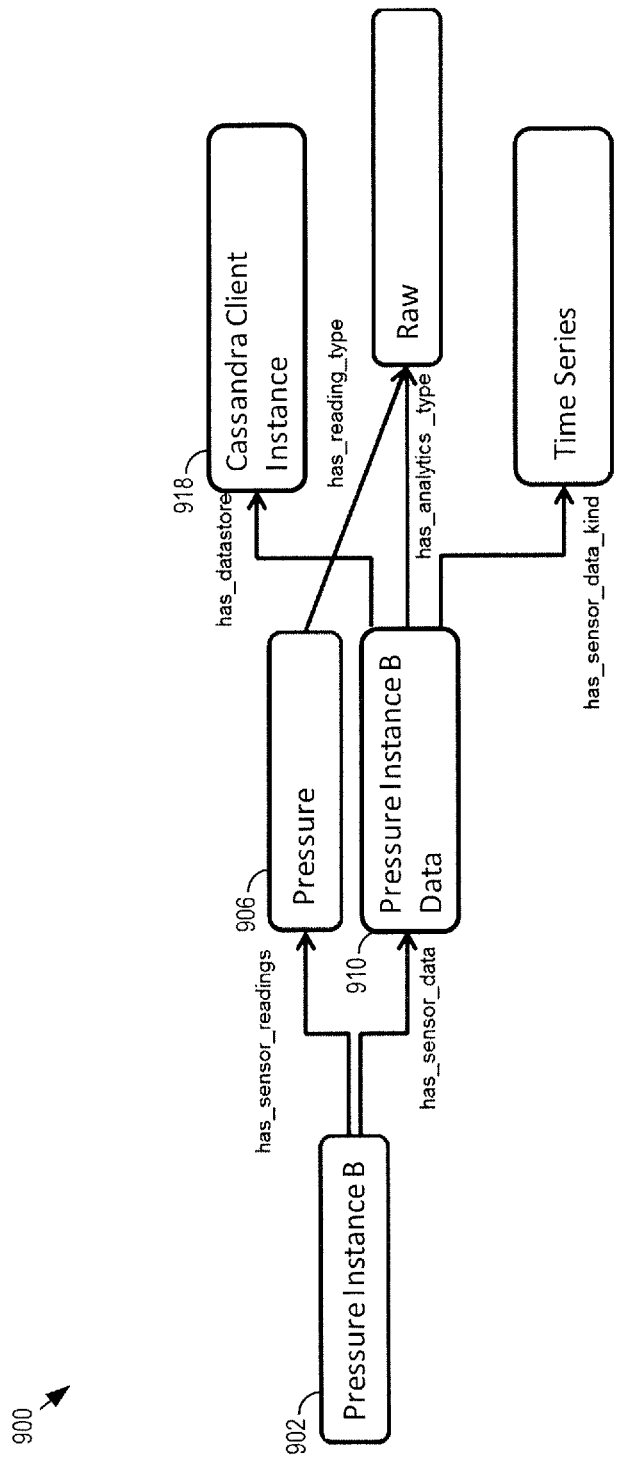
FIG. 9 shows an example of a second LDM instance of a core model in accordance with a contextual example.

It should be understood that the logic outlined in FIG. 6 can be repeatedly performed with different datasets (e.g., a second dataset) such that the data sources can be onboarded to the data control system 200 and LDM instances can be properly formed. FIG. 9 illustrates an abbreviated version of a second LDM instance 900 of core model 500. The second LDM instance 900 may be associated with a second data set that may be received by the communication interface 312, for example, from a second data source (e.g., a second pressure sensor). The second dataset may include second dataset context information comprising metadata associated with the second dataset. The logic 600 can operate as discussed above on the second dataset and can produce the example second LDM instance 900. The example second LDM instance 900 includes an identification 902 (here, being "Pressure Instance B") of the first LDM instance 900 as an instance of core model node 502; sensor readings 906 (here, being "Pressure") as an instance of core model node 506 sensor readings; a representation of the first portion of a second dataset 910 (here, being "Pressure Instance B Data") as an instance of the first dataset type node 510; a representation of the second portion of the second dataset 914 (here, being "Geo-location instance Data B") as an instance of the second dataset type node 514; and a representation of the first database 918 (here, being "Cassandra Client Instance") as an instance of the first database node 518. Similar or identical relationship edges may exist in the second LDM instance 900 as the example core model 500. Once instantiated by the LDM control circuitry 208, the second LDM instance 900 is saved as part of the LDM 700 to be recalled or navigated at a later time.

The LDM instances capture the linking between first-order data (e.g., raw sensor data), second-order data (e.g., context data), or any other data according to the relationships and structure dictated by the corresponding core model. Thus, although different types of data may be stored across disparate databases within the diverse data system 100, the linking can be recalled at a later point (discussed below) to allow applications to utilize the linked data without the necessity that the applications (or the creators of the applications) have explicit knowledge of the linking or the technical details (e.g., storage location of context data) for the linked data.

Figure 10:
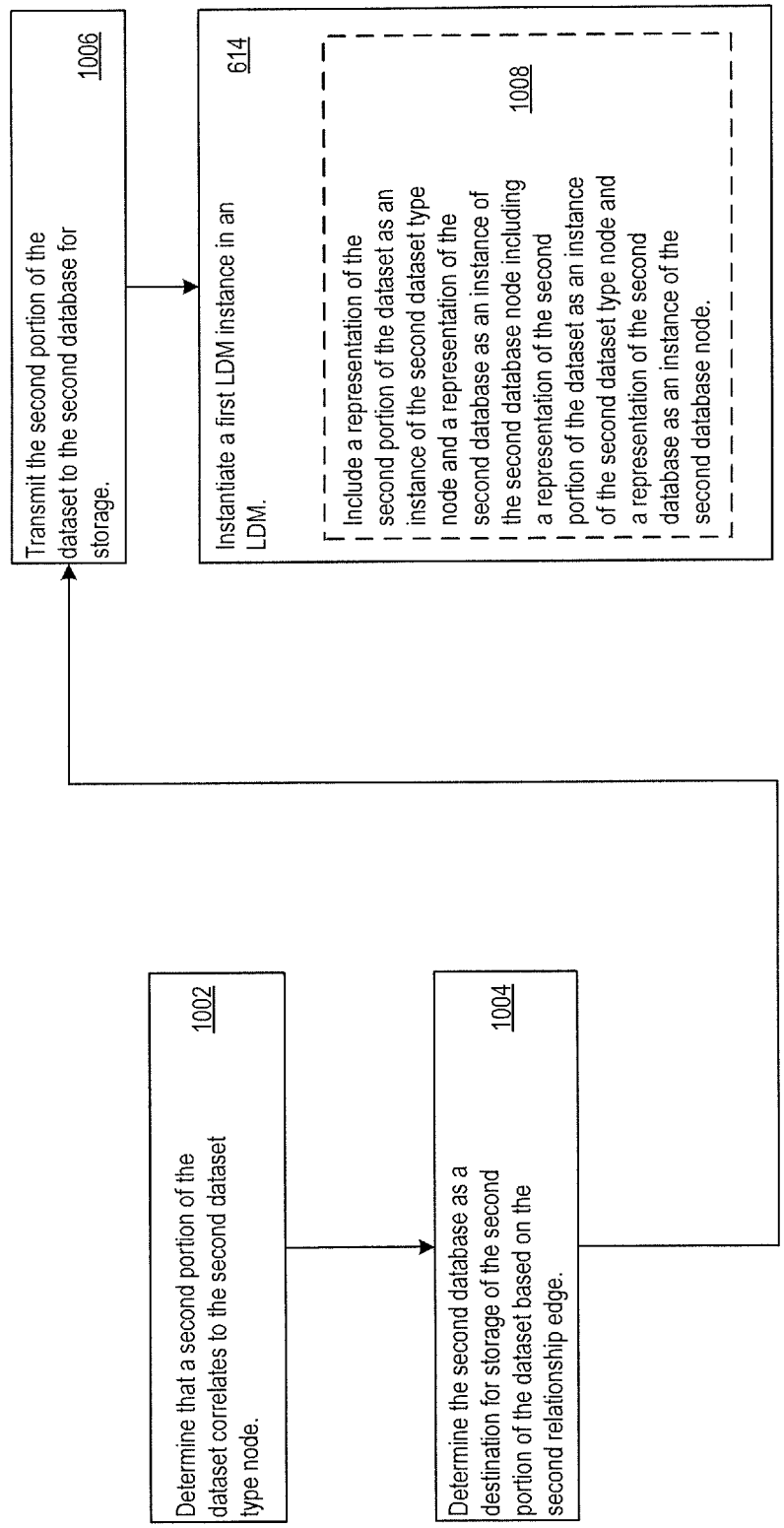
FIG. 10 shows a flow diagram of logic that the data control system may implement.

Modifications and/or additions to the disclosed logic 600 of FIG. 6 are now described. Various portions of the following logic may be implemented with or independent of the logic 600 or other logic described elsewhere. FIG. 10 provides a flow chart of additional logic 1000. The processor 316 determines that a second portion of the dataset correlates to the second dataset type node 514 of the core model 500 (1002) (see FIG. 5). This determination (1002) may be implemented in a similar manner as logic portion 606, discussed above.

The processor 316 determines the second database as a destination for storage of the second portion of the dataset (1004). In various embodiments, this determination is made based on the relationship edge 520 between the second dataset type node 514 and the second database node 522.

The communication interface 312 (e.g., as part of the data ingestion circuitry 202) transmits the second portion of the dataset to the second database for storage within the second database (1006). Continuing with the contextual example, if second dataset type node 514 corresponds to geo-location data (e.g., location of the sensor), and if second database node 522 corresponds a RDBMS database 110 as the second database, then the communication interface 312 transmits the geo-location data to the RDBMS database 110 for storage in the RDBMS database 110.

The LDM control circuitry 208 instantiates the first LDM instance 800 (1008). This instantiation (1008) may optionally be implemented in conjunction with instantiation logic 614 discussed above. The instantiation (1008) may be implemented by also including the representation of the second portion of the dataset (e.g., node 814 "Geo-location instance Data A") as an instance of the second dataset type node 514 and a representation of the second database 822 (e.g., "RDBMS Client Instance") as an instance of the second database node 522.

After the actions outlined by logic 1000 are performed, a second portion of the dataset generated by or about the data source can be stored in a separate database from the first portion of the dataset and the linking between the two portions of the dataset can be maintained in the LDM 700.

Figure 11:
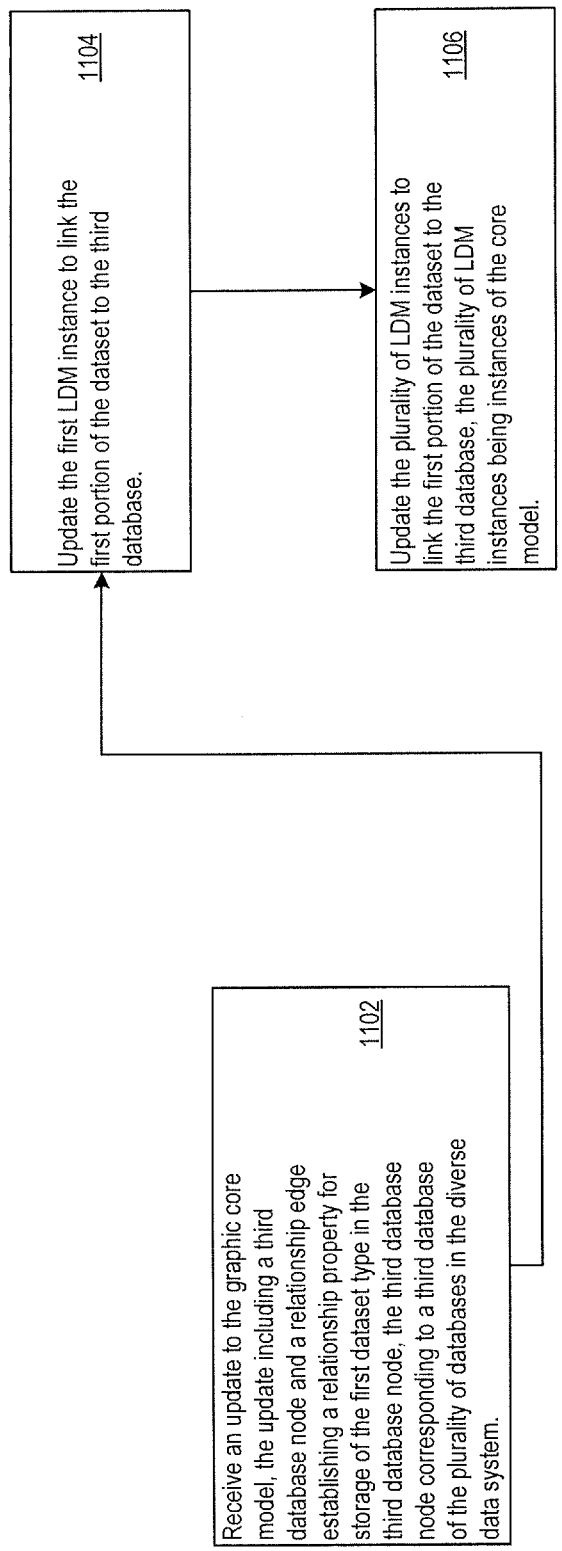
FIG. 11 shows another flow diagram of logic that the data control system may implement.

In various embodiments, a core model 500 can be updated to easily alter aspects of the data relationships. The alterations can be implemented retroactively or can be implemented in a from-here-on manner. FIG. 11 provides logic 1100 implementing such operations. Particularly, the logic 1100 describes an implementation for changing a database storage location for a core model and, optionally, propagating the changes throughout the LDM model 700 and diverse data system 100.

The LDM control circuitry 208 receives an update to a core model, for example, core model 500 (1102). The update may include a third database node and a relationship edge establishing a relationship property for storage of the first dataset type in the third database node. The third database node corresponding to a third database of the databases in the diverse data system. For example, and continuing with the contextual example, FIG. 5 shows the third database node 526 and the relationship edge 524 between the first dataset type node 510 and the third database node 526.

The LDM control circuitry 208 updates the LDM 700 by updating the first LDM instance 800 to link the representation of the first portion of the dataset (e.g., node 810 in FIG. 8) to the representation of the third database (e.g., node 826 in FIG. 8) (1104). Optionally, the representation of the first database 818 can also be removed or disconnected if the changes to the core model 500 indicate such a change.

The LDM control circuitry 208 can propagate the change to all or some LDM instances of the updated core model (1106). This may be implemented, for example, by linking the representations of the first portion of the respective datasets to the representation of the third database (e.g., node 826 in FIG. 8).

In addition to data ingestion and control of the LDM 700, the data control system 200 also includes, in some embodiments, data consumption circuitry 204 to allow consumption or usage of data stored within and across the diverse data system 100. Similarly, the data control system 200 also may include the data exploration circuitry 206 to allow exploration (e.g., by a user or another computing device) of the data stored within and across the diverse data system 100. Both the data consumption circuitry 204 and the data exploration circuitry 206 communicate with the LDM control circuitry 208 to reference the LDM 700 to discover locations of first-order data and related second-order data (for example, for a particular data source (e.g., a particular sensor)) or data from other related data sources (e.g., data from another sensor). In some approaches, the data consumption circuitry 204 and the data exploration circuitry 206 communicate with each other to reuse features of data exploration and consumption common to both. Similarly, in other approaches, the data consumption circuitry 204 and the data exploration circuitry 206 may comprise a single circuitry component that performs both functions.

Figure 12:
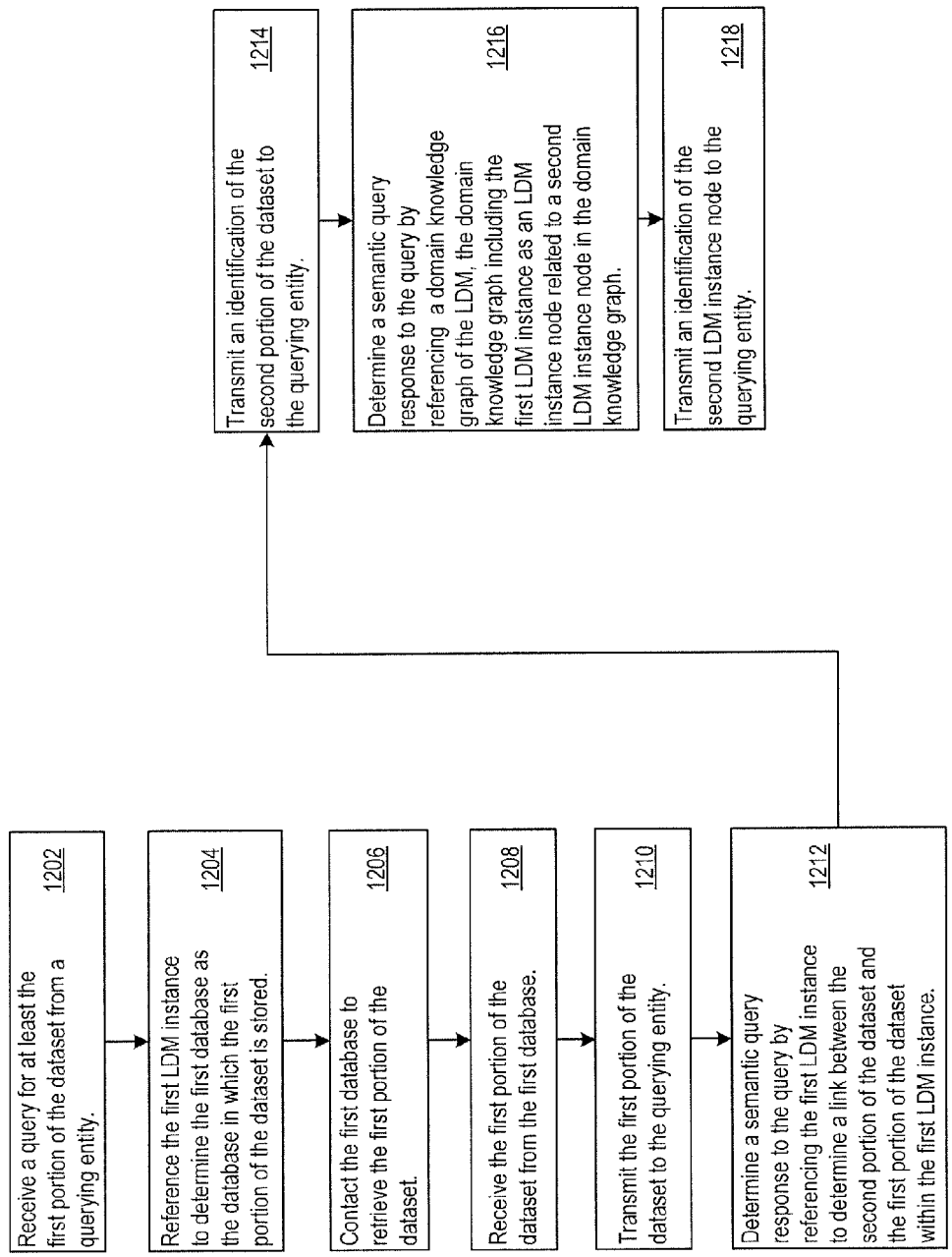
FIG. 12 shows another flow diagram of logic that the data control system may implement.

FIG. 12 provides a flow diagram of logic for use with the data consumption circuitry 204 to allow consumption of the data stored in and across the diverse data system 100. In this manner, the data consumption circuitry 204 may be configured to implement all or some of the following logic. The data consumption circuitry 204 may include the processing device 316 or may be instantiated on the processing device 316. The logic laid out in FIG. 12 may be implemented independent of or in conjunction with other logic described within this specification. A communication interface 312 (which may be part of or in communication with the data consumption circuitry 204) receives a query for the first portion of the dataset (1202). As an example, the query may be for the pressure sensor data (e.g., "Pressure Instance A Data" at node 810) of the first LDM instance 800 pressure sensor (see FIG. 8). The query may be received from a querying entity (e.g., a user, another computer or system, an application, or another data consumer).

The LDM control circuitry 208 (possibly by request of the data consumption circuitry 204) references the first LDM instance 800 to determine the first database as the database in which the first portion of the dataset is stored (1204). This referencing procedure may be performed with a SPARQL query or the like. As an example, the LDM control circuitry 208 may find the first portion of the dataset (e.g., "Pressure Instance A Data" at node 810) within the LDM 700 and within the first LDM instance 800. The LDM control circuitry 208 may then follow the relationships in the first LDM instance 800 to determine that the first portion of the dataset (e.g., "Pressure Instance A Data" at node 810) has a relationship edge connected to the representation of the first database 818 indicating that the data is stored in the first database (e.g., the Cassandra database client instance).

The processor 316 contacts the first database via communication interface 312 to retrieve the first portion of the dataset (1206). The communication interface 312 receives the first portion of the dataset from the first database (1208). and transmits the first portion of the dataset to the querying entity (1210). Alternatively, the data consumption circuitry 204 may provide the querying entity with the address, location, or other data necessary to allow the querying entity to retrieve the physical data itself from the first database instead of routing the data through the data consumption circuitry 204 or the communication interface 312.

The data control system 200 includes an ability to provide semantic query responses to queries by providing other data, or indications of the existence of the other data, related to the queried data. For example, if a querying entity wants the pressure sensor data (e.g., "Pressure Instance A Data" at node 810) of a particular pressure sensor, the system may also let the querying entity know about other linked data from the pressure sensor (e.g., "Geo-location Instance data A" at node 814). This is illustrated at logic portion 1212 wherein the processor 316 and/or the data consumption circuitry 204 determines a semantic query response to the query by referencing, with the LDM control circuitry 208, the first LDM instance 800 to determine a link between the first portion of the dataset and the second portion of the dataset. The links may be direct (e.g., relationship edges existing directly between nodes) or indirect (e.g., through one or more other nodes and comprising multiple relationship edges). In the example first LDM instance 800, the link is discovered by the fact that the "Pressure Instance A Data" at node 810 is coupled to the "Geo-location Instance data A" at node 814 via the relationship edges that couple both back to the root identification node 802 of the first LDM instance 800. The processor 316 (e.g., of data consumption circuitry 204) can determine that the first and second portions of the dataset are related to the first LDM instance 800 and are thus interrelated. A semantic query response can be returned to the querying entity by transmitting the identification of the second portion of the dataset to the querying entity via the communication interface 312 (1214). Alternatively or additionally, the actual second portion of the dataset (e.g., the actual content) can be provided to the querying entity, for example, upon request to retrieve the second portion.

In a similar manner, relationships can be discovered between different LDM instances within the domain knowledge graph 702 of the LDM 700. The processor 316 and/or the data consumption circuitry 204 can determine a semantic query response to the query by referencing, with the LDM control circuitry 208, the domain knowledge graph 702 of the LDM 700 (1216). For example, the processor 316 may discover that the first LDM instance 800 (at first LDM instance node 716) is linked to the second LDM instance 900 (at second LDM instance node 720) via relationship edges 714 and 718 linking both LDM instances back to node 712. Accordingly, the data consumption circuitry 204 can transmit via the communication interface 312 an identification of the second LDM instance as a semantic query response (1218).

Many functions described above with respect to the data consumption circuitry 204 may also be are also possible by using the data exploration circuitry 206, described below, and vice versa.

Figure 13:
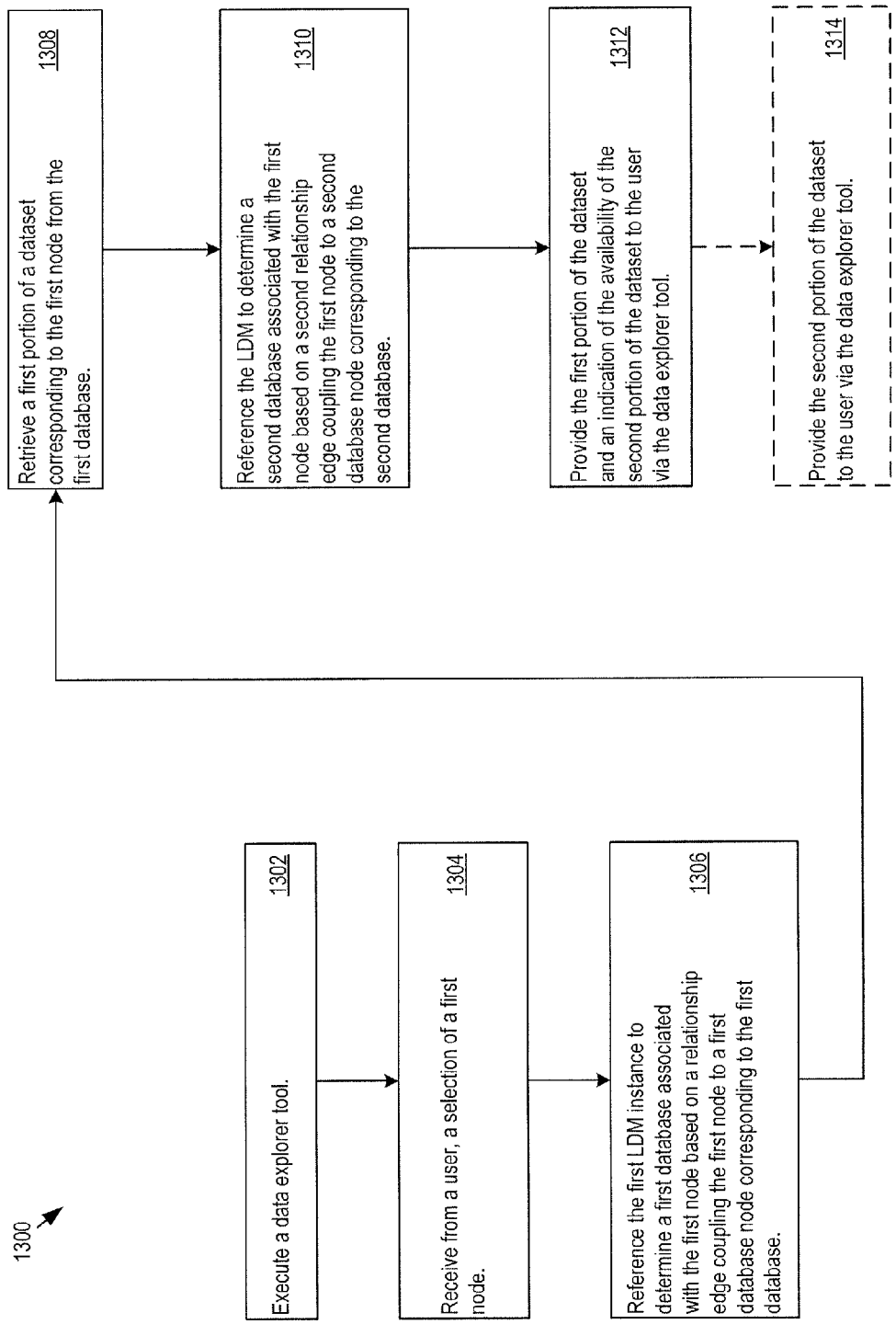
FIG. 13 shows another flow diagram of logic that the data control system may implement.

FIG. 13 provides a flow diagram of logic 1300 for use with the data exploration circuitry 206 to allow exploration of the data stored in and across the diverse data system 100. In this manner, in various embodiments, the data exploration circuitry 206 may be configured to implement all or some of the following logic. The data exploration circuitry 206 may include the processing device 316 or may be instantiated on the processing device 316. This logic 1300 may be implemented independent of or in conjunction with other logic described within this specification.

The processor 316 and/or the data exploration circuitry 206 executes a data explorer tool 210 (1302). In various embodiments, the data explorer tool 210 may be provided to a user, for example, with a GUI 1400 (see FIG. 14) that is provided via user interface 318. The user can view and interact with the GUI 1400 via a computing device, such as a desktop computer or a mobile device, to explore and view data within and across the diverse data system 100. The data explorer tool 210 may be stored on memory 320. Alternatively, the data explorer tool 210 may be provided as a service by other service providers and interacts with the data exploration circuitry 206 and/or the LDM control circuitry 208.

The data explorer tool 210 receives from a user a selection of a first node (e.g., first LDM instance node 716) of a plurality of nodes of a domain knowledge graph 702 of the LDM 700 (1304). The first node corresponds to a first LDM instance (e.g., first LDM instance 800) of a core model (e.g., core model 500).

Figure 14:
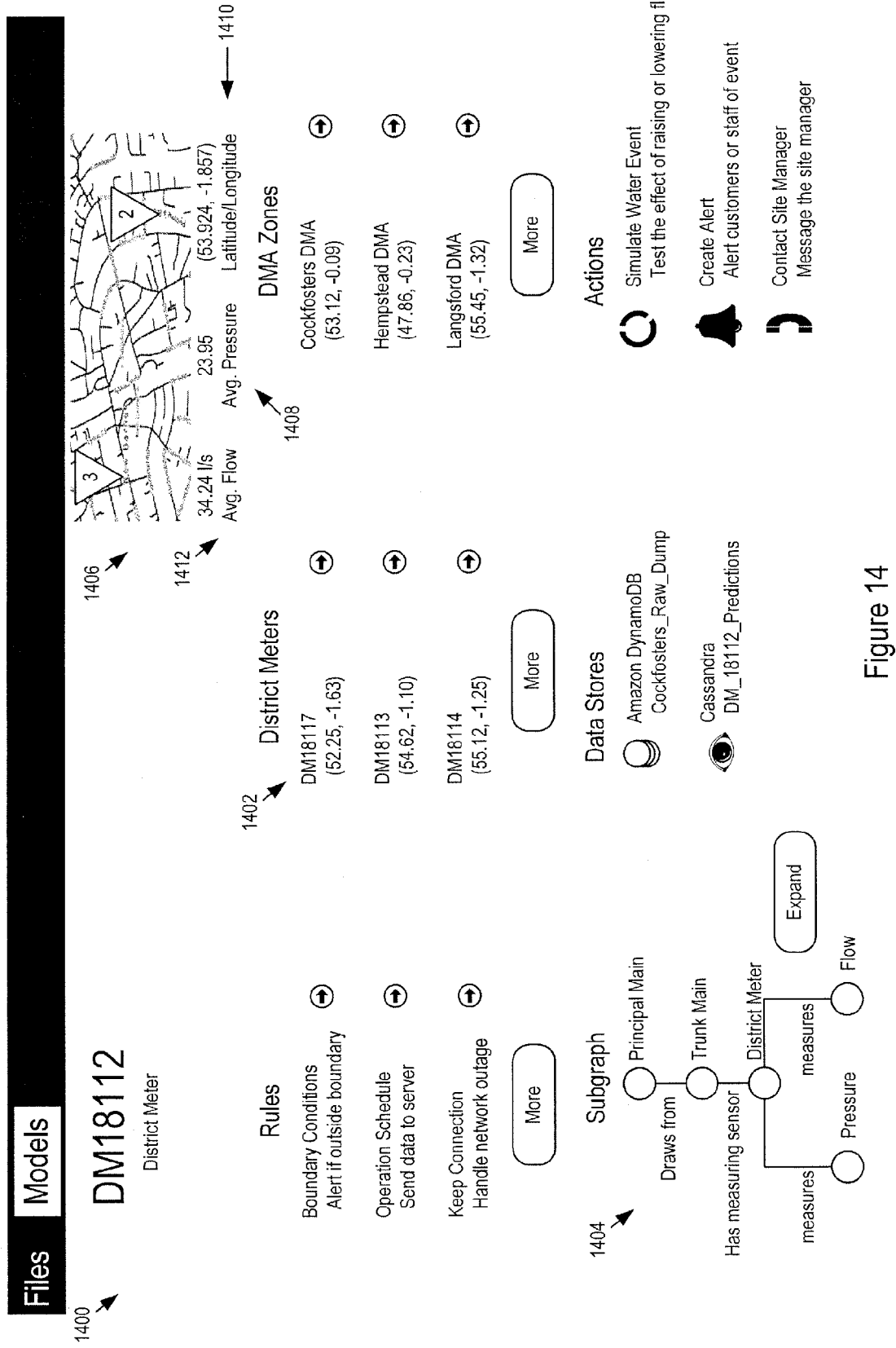
FIG. 14 shows an example graphical user interface.

FIG. 14 shows a GUI 1400. The user may effect a selection of a node by navigating to or selecting the particular node, for example, from a list of nodes 1402, a graphical representation 1404 of the domain knowledge graph 702, a map 1406, or other means. The GUI 1400 shows that district meter "DM18112" has been selected and that the GUI 1400 responsively presents information related to that district meter.

The data explorer tool 210, via the LDM control circuitry 208, references the first LDM instance 800 to determine a first database associated with the first node based on a relationship edge or series of relationship edges coupling the first node to the first database node corresponding to the first database (1306). For example, with reference to FIGS. 7 and 8, the first node may be first LDM instance node 716, and it may be determined that the representation of the first database 818 (corresponding to the first database) is related to first LDM instance node 716 by the relationship edges within the first LDM instance 800.

The first portion of the dataset that corresponds to the first node (e.g., first LDM instance node 716) can be retrieved from the first database as discussed above (1308).

The data explorer tool 210, via the LDM control circuitry 208, references the first LDM instance 800 to determine a second database associated with the first node (1310). This determination may be based on the relationship edge or series of relationship edges coupling the first node to the second database node corresponding to the second database within the first LDM instance 800. Further, this determination may be implemented separate or together with logic portion 1306. For example, with reference to FIGS. 7 and 8, the first node may be first LDM instance node 716, and it may be determined that the representation of the second database 822 is related to first LDM instance node 716 by the relationship edges within the first LDM instance 800.

As discussed above, the second database may store a second portion of the dataset corresponding to the first LDM instance 800. Thus, the data explorer tool 210 can provide both the first portion of the dataset to the user, as well as an indication of the availability or existence of the second portion of the dataset to the user (1312). In another embodiment, the actual second portion of the dataset (e.g., the actual data) can be provided to the user instead of just an indication of its existence (1314).

For example, and returning to the GUI 1400 of FIG. 14, the data explorer tool 210 may provide via the GUI 1400 the first portion of the dataset (or a result of analytics performed on the first portion of the data) at 1408 (showing average pressure). Similarly the data explorer tool 210 may provide via the GUI 1400 the second portion of the dataset (or indication of the availability of the second portion) at 1410 (showing actual location data for the sensor). Other data still may be provided via the GUI, for example, a third portion of the dataset or another dataset is shown at 1412 showing average flow.

Figure 15:
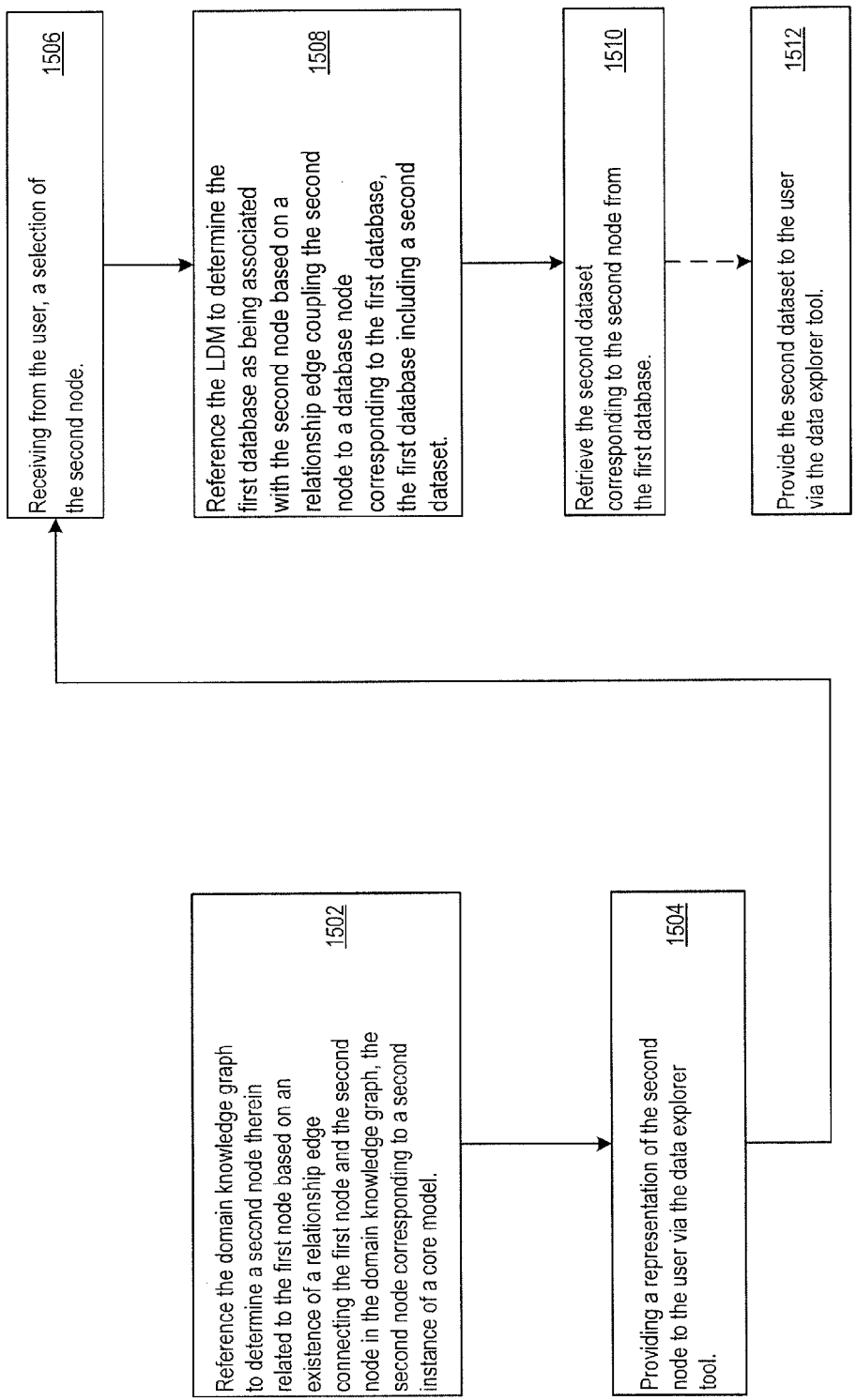
FIG. 15 shows another flow diagram of logic that the data control system may implement.

FIG. 15 provides a flow diagram of logic 1500 for use with the data exploration circuitry 206 to allow additional exploration of the data stored in and across the diverse data system 100. The individual portions or segments logic 1500 may be implemented independent of or in conjunction with other logic disclosed within this specification. The data exploration tool 210 references the domain knowledge graph 702 to determine a second node related to the first node based on an existence of a relationship edge connecting the first node and the second node in the domain knowledge graph, the second node corresponding to a second instance of a core model (1502). For example, with reference to FIG. 7, the first node may be first LDM instance node 716 (corresponding to the first LDM instance 800 of core model 500) and second node may be second LDM instance node 720 (corresponding to the second LDM instance 900 of core model 500). It may be determined that the first LDM instance node 716 is related to second LDM instance node 720 by the relationship edges 714 and 718 linking both LDM instances back to node 712.

The data exploration tool 210 may provide a representation of the second node to the user (1504). For example, with reference to the GUI 1400 in FIG. 14, the graphical representation 1404 of the domain knowledge graph 702 provides an indication of other nodes. Similarly, the list of nodes 1402 provides a listing including a second node (e.g., "DM18117").

The data exploration tool 210 may receive from the user a selection of the second node (1506). For example, the user may select the second node (e.g., "DM18117") via the GUI 1400. The data exploration tool 210 references the LDM 700 via the LDM control circuitry 208 to determine that the first database is associated with the second node (1508). This determination may be based on a relationship edge or series of relationship edges coupling the second node to a database node that also corresponds to the first database, which the first database includes a second dataset. For example, if the user selects a second LDM instance node 720 (FIG. 7), which includes the second LDM instance 900, the system will determine, by traversing the second LDM instance 900, that the second LDM instance node 720 is associated with a representation of the first database 918 (here, being "Cassandra Client Instance"), and is thus associated with the first database.

The data exploration tool 210 can retrieve the second dataset corresponding to the second node from the first database (1510). The data exploration tool 210 can provide the second dataset to the user via the data explorer tool (1512). For example, with reference to FIG. 14, if the user navigates to another district meter (e.g., "DM18117"), the user will be provided with new information pulled from the diverse data system 100 that corresponds to the newly selected district meter.

Figure 17:
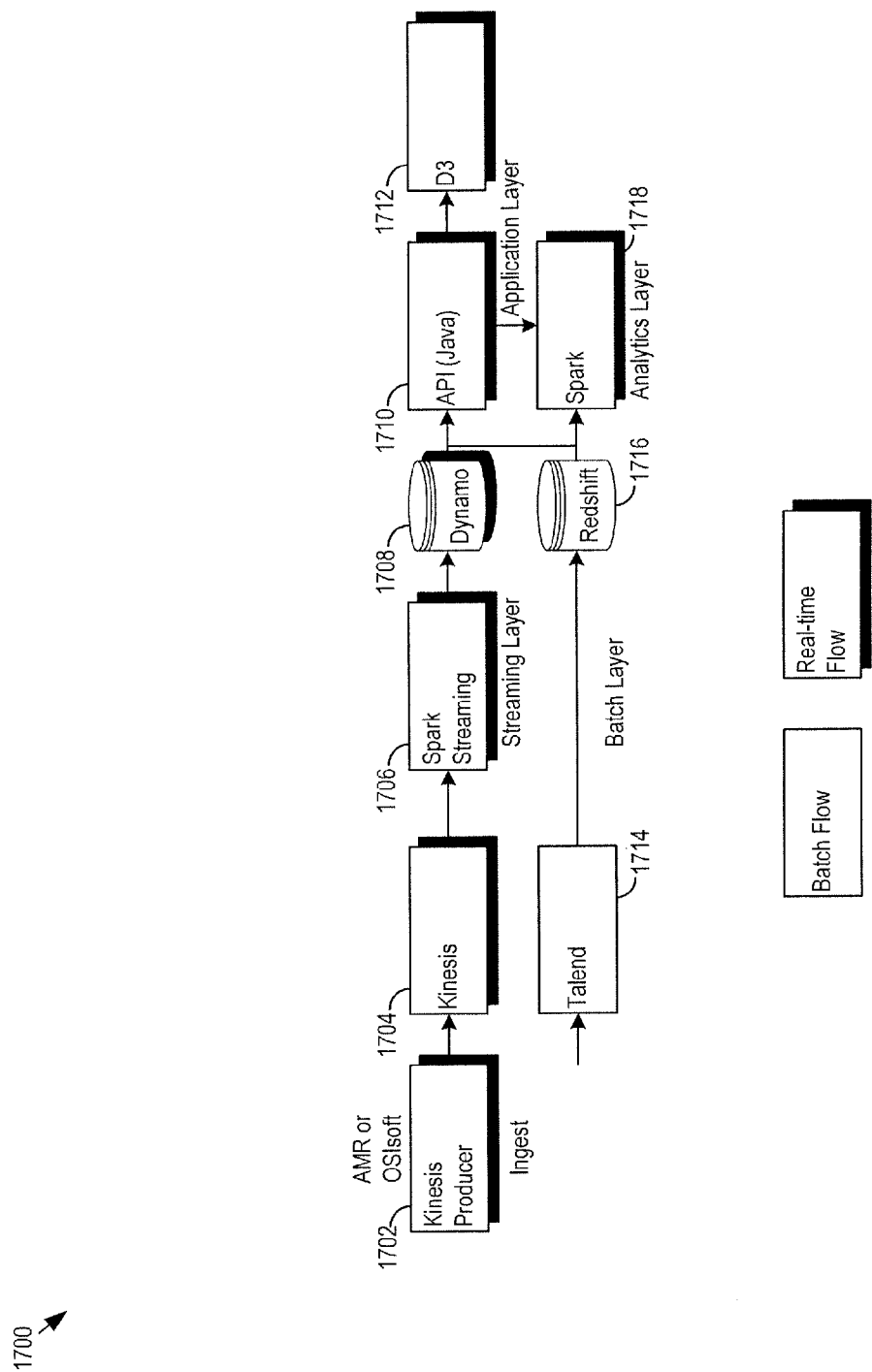
FIG. 17 shows an example architecture for data ingestion.

FIG. 17 shows an example architecture for data ingestion. A producer 1702 (e.g., Kinesis Producer) receives data (e.g., automatic meter reading (AMR) data or OSIsoft data) from data sources. The producer 1702 feeds captured data into a processing service 1704 (e.g., Kinesis), which in turn feeds a streaming service 1706 (e.g., Spark). The streaming service 1706 in turn feeds a database 1708 (e.g., Dynamo). The producer 1702, processing service 1704, streaming service 1706, database 1708 all represent real-time flow. In parallel with the real-time flow input, a batch processor service 1714 can produce batch layer data to a second database 1716 (Redshift). An applications layer, consisting of an API 1710 (e.g., in Java) and a data visualization tool 1712 (e.g., D3) can access the data in the first database 1708 and/or the second database 1716. An analytics layer consisting of an analytics engine 1718 (e.g., Spark) can also access the data in the first database 1708 and/or the second database 1716, possibly through the API 1710.

In accordance with various embodiments disclosed above, a data control system 200 and associated logic are provided that create a layer of abstraction surrounding a diverse data system 100. Interlinked data can be modeled in the LDM to capture all the associated linkages. Onboarding of data sources is streamlined by using the core models, which effectively and efficiently reuses previously modeled components. Because the linkages are maintained in the LDM, data and its associated linked data can later be accessed for consumption and exploration. Applications can interface with the abstraction layers to access the linked data without prior knowledge of the linkages or the precise storage locations for the linked data. Thus, the data control system 200 provides an extensible solution to data consumption that allows for forward compatibility with future-developed applications. Further, the system is adaptable in that it can create or utilize new relationships as they emerge as opposed to being hampered by initial choices made at design time.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
   receiving a dataset at a communication interface, the dataset including dataset context information comprising metadata for the dataset;
   determining by a processor a core model correlating to the dataset based on the dataset context information, the core model comprising a first dataset type node, a first database node, and a first relationship edge existing between the first dataset type node and the first database node, the first relationship edge establishing a relationship property for storage of the first dataset type in the first database node, the first database node corresponding to a first database of a plurality of databases in a diverse data system;
   determining by the processor that a first portion of the dataset correlates to the first dataset type node;
   referencing, by the processor, the first relationship edge between the first dataset type node and the first database node to determine the first database is a destination for storage of the first portion of the dataset;
   transmitting by the communication interface the first portion of the dataset to the first database for storage;
   instantiating, by linked data model (LDM) control circuitry, a first LDM instance in an LDM, the first LDM instance comprising:
      definitional structure that represents the core model;
      a representation of the first portion of the dataset as an instance of the first dataset type node of the core model; and
      a representation of the first database as an instance of the first database node of the core model;
   receiving by the communication interface a query for at least the first portion of the dataset from a querying entity;
   referencing, by the LDM control circuitry, the first LDM instance to determine the first database as the database in which the first portion of the dataset is stored;
   transmitting by the communication interface the first portion of the dataset to the querying entity;
   determining by the processor a semantic query response to the query by referencing, via the LDM control circuitry, a domain knowledge graph of the LDM, the domain knowledge graph including the first LDM instance as an LDM instance node related to a second LDM instance node in the domain knowledge graph; and
   transmitting by the communication interface an identification of the second LDM instance node to the querying entity.

2. The method of claim 1 wherein the core model includes a second dataset type node, a second database node, and a second relationship edge existing between the second dataset type node and the second database node, the second relationship edge establishing a relationship property for storage of the second dataset type in the second database node, the second database node corresponding to a second database of the plurality of databases in the diverse data system, the method further comprising:
   determining by the processor that a second portion of the dataset correlates to the second dataset type node;
   referencing, by the processor, the second relationship edge between the second dataset type node and the second database node to determine the second database as a destination for storage of the second portion of the dataset;
   transmitting by the communication interface the second portion of the dataset to the second database for storage; and
   wherein instantiating, by the LDM control circuitry, the first LDM instance in the LDM further comprises including a representation of the second portion of the dataset as an instance of the second dataset type node and a representation of the second database as an instance of the second database node.

3. The method of claim 1 further comprising:
   contacting by the processor via the communication interface, the first database to retrieve the first portion of the dataset; and
   receiving by the communication interface the first portion of the dataset from the first database.

4. The method of claim 3 further comprising:
   determining by the processor a semantic query response to the query by referencing, via the LDM control circuitry, the first LDM instance to determine a link between a second portion of the dataset and the first portion of the dataset within the first LDM instance; and
   transmitting by the communication interface an identification of the second portion of the dataset to the querying entity.

5. The method of claim 1 further comprising:
   receiving, at the communication interface, a second dataset, the second dataset including second dataset context information comprising metadata associated with the second dataset;
   determining by the processor that the core model correlates to the second dataset based on the second dataset context information;
   determining by the processor that a first portion of the second dataset correlates to the first dataset type node of the core model;
   referencing by the processor the first relationship edge between the first dataset type node and the first database node to determine the first database is a destination for storage of the first portion of the second dataset;
   transmitting by the communication interface the first portion of the second dataset to the first database for storage; and
   instantiating, by the LDM control circuitry, a second LDM instance in the LDM, the second LDM instance having at least partially a same structure as the core model and including a representation of the first portion of the second dataset as an instance of the first dataset type node of the core model and a representation of the first database as an instance of the first database node of the core model.

6. The method of claim 5 further comprising:
updating, by the LDM control circuitry, a domain knowledge graph of the LDM to include the second LDM instance as an LDM instance node in relation to at least one other LDM instance node in the domain knowledge graph.

7. The method of claim 1 further comprising:
receiving an update to the core model, the update including a third database node and a relationship edge establishing a relationship property for storage of the first dataset type in the third database node, the third database node corresponding to a third database of the plurality of databases in the diverse data system; and
updating, by the LDM control circuitry, the first LDM instance to link the first portion of the dataset to the third database.

8. The method of claim 7 further comprising:
updating, by the LDM control circuitry, a plurality of LDM instances to link the first portion of the dataset to the third database, the plurality of LDM instances being instances of the core model.

9. A system comprising:
a communication interface configured to receive a dataset including dataset context information comprising metadata associated with the dataset;
a first core model including a first dataset type node, a first database node, and a first relationship edge existing between the first dataset type node and the first database node, the first relationship edge establishing a relationship property for storage of the first dataset type in the first database node, the first database node corresponding to a first database of a plurality of databases in a diverse data system;
data ingestion circuitry in communication with the communication interface and configured to:
    determine the core model as correlating to the dataset based on the dataset context information;
    determine that a first portion of the dataset correlates to the first dataset type node; and
    reference the relationship edge between the first dataset node and the first database node in the core model to determine the first database is a destination for storage of the first portion of the dataset;
the communication interface further configured to transmit the first portion of the dataset to the first database for storage;
linked data model (LDM) maintenance circuitry in communication with the data ingestion circuitry and configured to:
    instantiate a first LDM instance in an LDM, the first LDM instance having, at least partially, a same structure as the core model and including a representation of the first portion of the dataset as an instance of the first dataset type node of the core model and a representation of the first database as an instance of the first database node of the core model; and
    maintain a domain knowledge graph of the LDM including a domain knowledge graph including a first node corresponding to the first LDM instance; and
data exploration circuitry in communication with the communication interface and the LDM maintenance circuitry, the data exploration circuitry configured to:
    receive, from a user, a selection of the first node corresponding to the first LDM instance;
    communicate with the LDM maintenance circuitry to reference the first LDM instance to determine the first portion of the data set, the first database, and a second portion of the data set as associated with the first node; and
    provide to the user, the first portion of the dataset and a semantic response comprising an indication of an availability of a second portion of the dataset.

10. The system of claim 9 wherein:
the first core model further includes a second dataset type node, a second database node, and a second relationship edge existing between the second dataset type node and the second database node, the second relationship edge establishing a relationship property for storage of the second dataset type in the second database node, the second database node corresponding to a second database of the plurality of databases in the diverse data system;
the data ingestion circuitry is further configured to:
    determine that a second portion of the dataset correlates to the second dataset type node; and
    reference the second relationship edge between the second dataset type node and the second database node to determine the second database as a destination for storage of the second portion of the dataset;
the communication interface is further configured to transmit the second portion of the dataset to the second database for storage;
and
the LDM maintenance circuitry is further configured to:
    instantiate the first LDM instance by including a representation of the second portion of the dataset as an instance of the second dataset type node and a representation of the second database as an instance of the second database node.

11. The system of claim 10 further comprising:
data consumption circuitry in communication with the communication interface and the LDM maintenance circuitry, the data consumption circuitry configured to:
    receive a query via the communication interface for at least the first portion of the dataset from a querying entity;
    communicate with the LDM maintenance circuitry to reference the first LDM instance to determine the first database as the database in which the first portion of the dataset is stored; and
    contact, via the communication interface, the first database to retrieve the first portion of the dataset;
    determine a semantic query response to the query by communicating with the LDM maintenance circuitry to reference the first LDM instance to determine a link between the second portion of the dataset and the first portion of the dataset within the first LDM instance; and
    effect transmission via the communication interface of the first portion of the dataset and an identification of the second portion of the dataset to the querying entity.

12. The system of claim 10 wherein
the data exploration circuitry is further configured to:
    provide a data explorer tool to a user;
    receive, via the data explorer tool, from a user, the selection of the first node corresponding to the first LDM instance;
    contact, via the communication interface, the first database to retrieve the first portion of the dataset; and provide to the user, via the data exploration tool, the first portion of the dataset and the indication of the availability of the second portion of the dataset.

13. The system of claim 10 wherein:
the domain knowledge graph further includes:
   a second node corresponding to a second LDM instance of the core model, and
   a relationship edge coupling the first node to the second node;
the data exploration circuitry is further configured to:
   communicate with the LDM maintenance circuitry to reference the domain knowledge graph to determine the second node as associated with the first node based on the relationship edge coupling the first node to the second node; and
   provide to the user, via the data exploration tool, a representation of the indication of the second node.

14. The system of claim 13 wherein the second LDM instance indicates a second dataset is linked to the first database, wherein the data exploration circuitry is further configured to:
   receive from the user, via the data explorer tool, a selection of the second node;
   communicate with the LDM maintenance circuitry to reference the second LDM instance to determine the second dataset and the first database as associated with the second node;
   contact, via the communication interface, the first database to retrieve the second dataset; and
   provide to the user, via the data exploration tool, the second dataset.

15. The system of claim 12 wherein the data explorer tool comprises a graphical user interface (GUI).

* * * * *

UNITED STATES PATENT AND TRADEMARK OFFICE
CERTIFICATE OF CORRECTION

| | |
|---|---|
| PATENT NO. | : 9,953,081 B2 |
| APPLICATION NO. | : 14/870671 |
| DATED | : April 24, 2018 |
| INVENTOR(S) | : Karthik Gomadam et al. |

It is certified that error appears in the above-identified patent and that said Letters Patent is hereby corrected as shown below:

On the Title Page

In (30) Foreign Application Priority Data, insert --Aug. 31, 2015 (IN) 919CHE2015--

Signed and Sealed this
Third Day of September, 2019

Andrei Iancu
*Director of the United States Patent and Trademark Office*